United States Patent
Wood et al.

(10) Patent No.: US 12,163,366 B2
(45) Date of Patent: Dec. 10, 2024

(54) ACTIVE HOOD HINGE ASSEMBLY

(71) Applicant: Magna Closures, Inc., Newmarket (CA)

(72) Inventors: Thomas Wood, Midland (CA); Andrew R. McIntyre, Midland (CA)

(73) Assignee: Magna Closures, Inc., Newmarket (CA)

(*) Notice: Subject to any disclaimer, the term of this patent is extended or adjusted under 35 U.S.C. 154(b) by 111 days.

(21) Appl. No.: 17/472,448

(22) Filed: Sep. 10, 2021

(65) Prior Publication Data

US 2022/0136301 A1 May 5, 2022

Related U.S. Application Data

(60) Provisional application No. 63/108,254, filed on Oct. 30, 2020, provisional application No. 63/107,374, filed on Oct. 29, 2020.

(51) Int. Cl.
  *E05F 1/12* (2006.01)
  *B60R 21/38* (2011.01)

(52) U.S. Cl.
  CPC ............ *E05F 1/1207* (2013.01); *B60R 21/38* (2013.01); *E05Y 2900/536* (2013.01)

(58) Field of Classification Search
  CPC ......... B60R 21/38; B60R 21/34; B62D 21/10; B62D 21/12; E05D 7/00; E05D 11/00
  See application file for complete search history.

(56) References Cited

U.S. PATENT DOCUMENTS

| | | | |
|---|---|---|---|
| D335,622 S * | 5/1993 | Millsap | D8/323 |
| 6,513,617 B2 | 2/2003 | Sasaki | |
| 7,093,877 B2 * | 8/2006 | Duffy | E05F 1/1215 296/76 |
| 7,730,584 B2 | 6/2010 | Duffy | |
| 7,845,691 B2 * | 12/2010 | Sundararajan | B60R 21/38 292/201 |
| 7,896,122 B2 * | 3/2011 | Borg | B62D 25/12 180/274 |
| 8,414,058 B2 | 4/2013 | Duffy | |
| 8,544,590 B2 | 10/2013 | McIntyre | |
| 8,893,354 B2 | 11/2014 | McIntyre et al. | |

(Continued)

FOREIGN PATENT DOCUMENTS

| | | | |
|---|---|---|---|
| CN | 102887175 A | 1/2013 | |
| CN | 109501868 A * | 3/2019 | B60R 21/38 |

(Continued)

OTHER PUBLICATIONS

Dix, May 2016, DE 102014015998 A1, Machine Translation of Specification.*

(Continued)

*Primary Examiner* — Amy R Weisberg
*Assistant Examiner* — Matthew Joseph Ganci
(74) *Attorney, Agent, or Firm* — Dickinson Wright PLLC

(57) ABSTRACT

An active hinge including a body bracket for attachment to a vehicle body. A hood bracket is provided for rotational attachment to a vehicle hood. An actuator is provided for selectively transitioning the active hood hinge from a normal mode where the rotation of the hood bracket is restricted, to an active pedestrian mode where the rotation of the hood bracket is unrestricted.

26 Claims, 33 Drawing Sheets

(56) References Cited

U.S. PATENT DOCUMENTS

| | | | |
|---|---|---|---|
| 9,283,924 B1 * | 3/2016 | Farooq | B60R 21/38 |
| 9,366,066 B2 | 6/2016 | Hwang | |
| 9,701,277 B2 * | 7/2017 | McIntyre | B60R 21/38 |
| 10,118,587 B2 | 11/2018 | Czechtizky | |
| 11,383,672 B2 | 7/2022 | Wood et al. | |
| 2009/0050388 A1 | 2/2009 | Leong | |
| 2014/0182962 A1 * | 7/2014 | McIntyre | B60R 21/38 |
| | | | 180/274 |
| 2016/0245003 A1 | 8/2016 | McIntyre et al. | |
| 2017/0057458 A1 | 3/2017 | Narita et al. | |
| 2018/0141516 A1 * | 5/2018 | Hwang | B60R 21/38 |
| 2019/0375369 A1 * | 12/2019 | Hufen | B60R 21/38 |
| 2022/0185226 A1 | 6/2022 | Wood et al. | |

FOREIGN PATENT DOCUMENTS

| | | | | |
|---|---|---|---|---|
| CN | 209494377 U | 10/2019 | | |
| DE | 102006010801 A1 * | 9/2007 | | B60R 21/38 |
| DE | 102014015998 A1 * | 5/2016 | | B60R 21/38 |
| DE | 112013007464 T5 | 8/2016 | | |
| EP | 0361020 A1 * | 4/1990 | | E05D 3/16 |
| WO | WO-2011026811 A1 * | 3/2011 | | B60R 21/38 |
| WO | 2015047425 A1 | 4/2015 | | |

OTHER PUBLICATIONS

Chen, Mar. 2019, CN-109501868-A, Machine Translation of Specification.*

* cited by examiner

ACTIVE HOOD HINGE ASSEMBLY

CROSS REFERENCE TO RELATED APPLICATIONS

This utility patent application claims the benefit and priority of U.S. Provisional Application Ser. No. 63/107,374 filed on Oct. 29, 2020, and U.S. Provisional Patent Application Ser. No. 63/108,254 filed on Oct. 30, 2020. The entire disclosures of the above-applications are incorporated herein by reference.

FIELD OF THE INVENTION

The present disclosure relates generally to pedestrian protection systems for motor vehicles of the type having a deployable hood assembly equipped with active hinges. More particularly, the present disclosure is directed to an active hinge for use with a deployable hood assembly which provides increased range of movement of the hood.

BACKGROUND OF THE INVENTION

This section provides background information related to the present disclosure which is not necessarily prior art.

In recent years, a great deal of emphasis has been directed to development of pedestrian protection systems for use in motor vehicles in an effort to reduce the likelihood or severity of injuries caused during a collision between a pedestrian and a motor vehicle. One such area of development has been directed to equipping the motor vehicle with a hood assembly capable of absorbing impact forces.

A "passive" pedestrian protection system associated with the hood assembly includes providing a pocket of under-hood crush space between the hood and the components within the vehicle's engine compartment. This crush space is configured to reduce the chance of bodily impact with the components within the engine component and, more particularly, to provide an impact absorbing feature. However, the use of low profile hoods in modern motor vehicles for improved aesthetics and aerodynamics, in combination with smaller engine compartments, limits the available crush space.

As an alternative, an "active" pedestrian protection system associated with the vehicle's hood assembly provides a "deployable" hood that is configured to raise a rear portion of the latched hood to create the additional under-hood crush space. This deployable hood feature is activated in response to detection of a pedestrian collision with the front end of the motor vehicle. Typically, a pair of active hinges are incorporated into the hood assembly. Each active hinge includes a pivot linkage interconnecting the hood to the vehicle body and an actuator that is operable to forcibly move the pivot linkage for causing the hood to move from a non-deployed position to a deployed position in response to detection of the pedestrian impact. Examples of active hinges that provide this functionality are disclosed in commonly-owned U.S. Pat. Nos. 8,544,590 and 8,893,354.

There remains a need for further improvements to such active hinges.

SUMMARY OF THE INVENTION

This section provides a general summary of the disclosure and is not intended to be interpreted as a comprehensive listing of its full scope or of all of its objects, aspects, features and/or advantages.

It is an aspect of the present disclosure to provide an active hinge that is simple in design, uses few components, and is inexpensive to manufacture and incorporate into vehicles.

It is another aspect of the present disclosure to provide an active hinge that provides an expanded pedestrian cushion zone during a collision event while also providing normal opening and closing of the hood during normal use.

According to these and other aspects of the disclosure, an active hinge is provided. The active hinge includes a body bracket for attachment to a vehicle body. A hood bracket is provided for attachment to a vehicle hood and is rotatable about a pivot point. An actuator is provided for selectively transitioning the active hood hinge from a normal mode where the rotation of the hood bracket about the pivot point is restricted, to an active pedestrian mode where the rotation of the hood bracket about the pivot point is unrestricted.

Accordingly, the additional rotation of the hood bracket provides an expanded path of upward and rearward movement of the vehicle hood during collision events, while preserving normal operation of the vehicle hood outside of the occurrence of collision events. The active hinge assembly is also simple in design, as it only requires two brackets and only includes two primary pivot points to provide the expanded path of the vehicle hood.

According to another aspect of the disclosure, an active hinge is provided. The active hinge includes a body bracket for attachment to a vehicle body. The active hinge also includes a hood bracket for attachment to a vehicle hood. The hood bracket is rotatable about a pivot point. A deploy bracket is operatively coupled to the hood bracket by a first multi-bar linkage assembly and is operatively coupled to the body bracket by a second multi-bar linkage assembly. An actuator is provided for selectively transitioning the active hood hinge from a normal mode wherein the movement of the hood is defined by the movement of the first multi-bar linkage assembly, allowing the hood bracket to move relative to the deploy bracket, to an active pedestrian mode where movement of the hood is defined by movement of the first and second multi-bar linkage assemblies, allowing the deploy bracket and the hood bracket to move relative to the body bracket.

Accordingly, this arrangement of the active hinge provides two separate multi-bar linkage assemblies that operate in tandem to provide both upward and rearward movement of the vehicle hood in the deployed, active pedestrian mode, thus providing a large cushion space under the hood. On the other hand, use of only one of the linkage assemblies is required to provide opening and closing of the hood during normal, undeployed use of the active hinge.

According to another aspect of the disclosure, an active hinge is provided. The active hinge includes a body bracket for attachment to a vehicle body. The active hinge also includes a hood bracket for attachment to a vehicle hood. A deploy bracket is rotatably connected to the hood bracket. A linkage assembly interconnects the deploy bracket and the body bracket. A release latching wire is moveable between a locked position and an unlocked position, where the release latching wire inhibits movement of the hood bracket relative to the deploy bracket when in the locked position, and where the release latching wire allows movement of the hood bracket relative to the deploy bracket when in the unlocked position. An actuator is configured to selectively move the release latching wire from the locked position to the unlocked position.

The arrangement of the release latching wire provides a simple manner of decoupling the hood bracket from the deploy bracket to provide the cushioning effect in the active pedestrian mode. Additionally, the release latching wire can advantageously follow a path in various directions (not fixed along a single axis), thus providing flexibility to the system.

Further areas of applicability will become apparent from the description provided. The description and specific examples in this summary are intended for purposes of illustration only and are not intended to limit the scope of the present disclosure.

DRAWINGS

The drawings described herein are for illustrative purposes only of selected embodiments and not all possible implementations thereof such that the drawings are not intended to limit the scope of the present disclosure.

Figure 33:
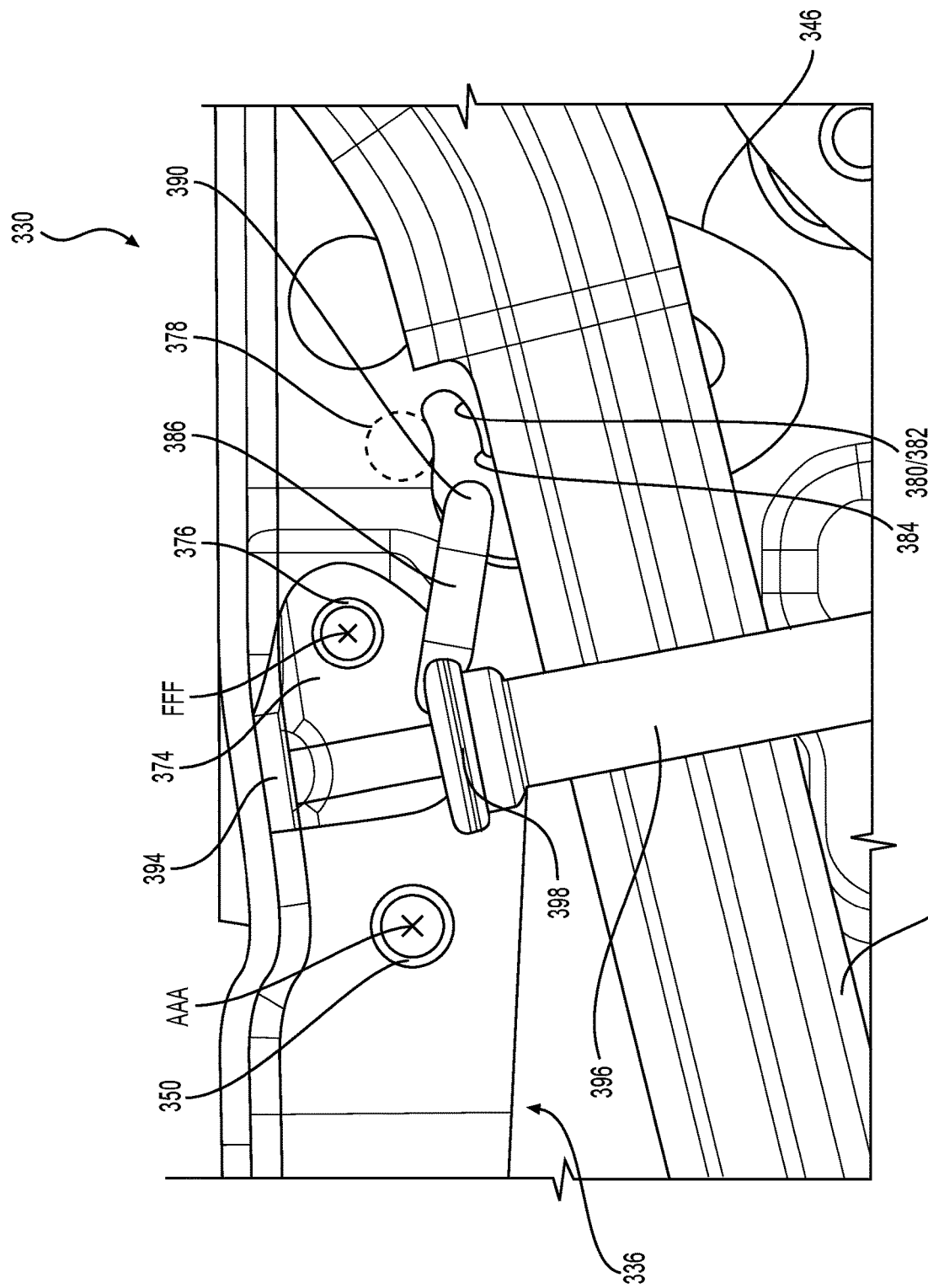
Figure 34:
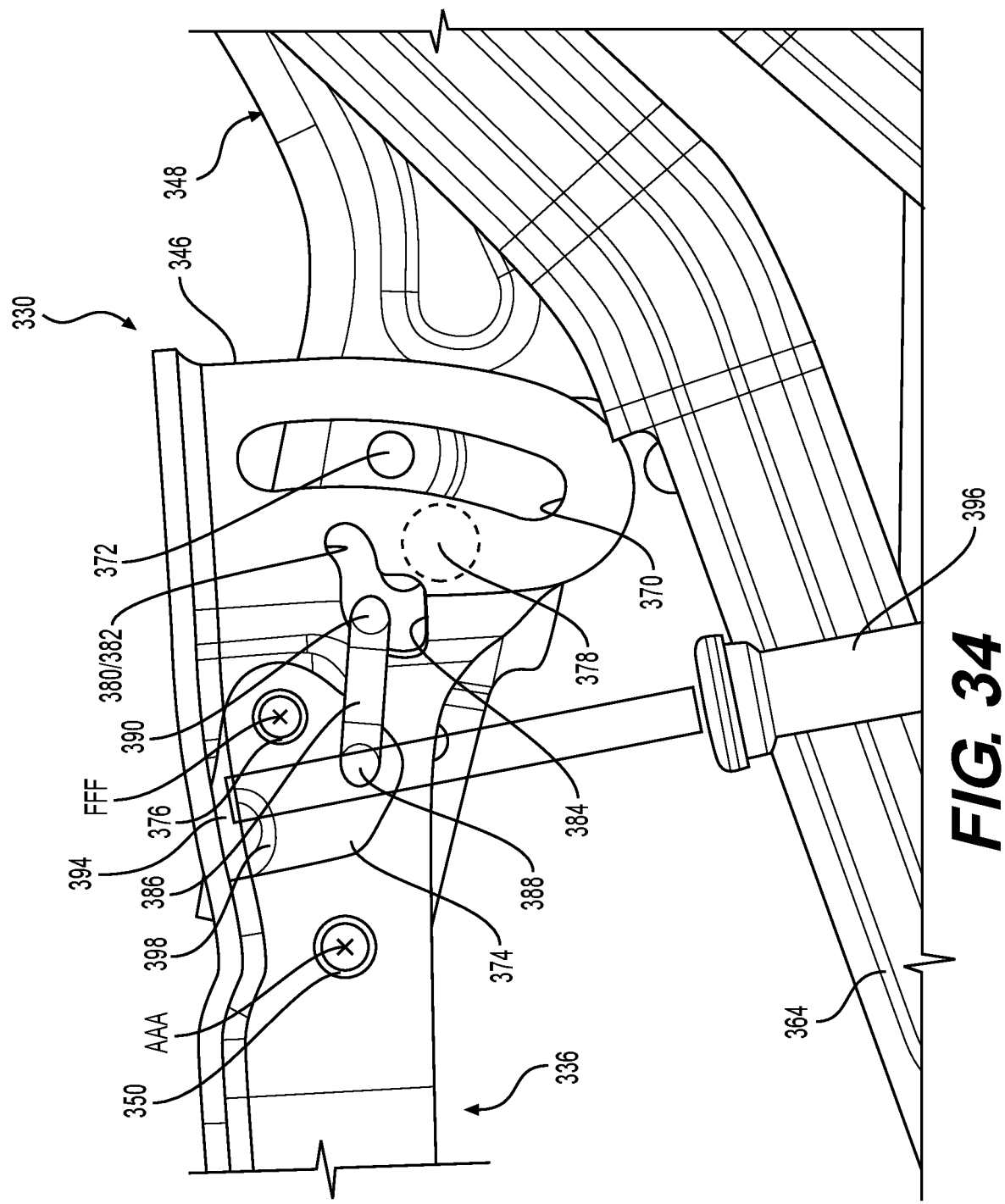

FIG. 33 is a magnified side view of the hood bracket, rotary bracket and deploy bracket of the third embodiment of the active hinge, illustrating the actuator after detection of a collision event and moving the active hinge toward the deployed mode; and FIG. 34 is a magnified side view of the hood bracket, rotary bracket and deploy bracket of the third embodiment of the active hinge, illustrating the actuator after detection of a collision event, with the actuator further rotating the rotary bracket and rotating the hood bracket relative to the deploy bracket toward the deployed mode.

Corresponding reference numerals indicate corresponding parts throughout the several view of the drawings.

DETAILED DESCRIPTION

Example embodiments of a vehicle hood assembly having a hood and at least one active hinge embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms and that neither should be construed to limit the scope of the disclosure. In some example embodiments, well-known processes, well-known device structures, and well-known technologies are not described in detail.

As will be detailed, the active hinges of the present disclosure are used as part of a hood assembly for a pedestrian protection system on motor vehicles. More specifically, active hinges of the type disclosed herein are used for mounting a vehicle hood to a vehicle body in an effort to introduce an additional degree of freedom in the movement of the vehicle's hood when a pedestrian is struck by the vehicle to reduce the severity of injuries sustained when the pedestrian contacts the vehicle's hood.

Figure 1:
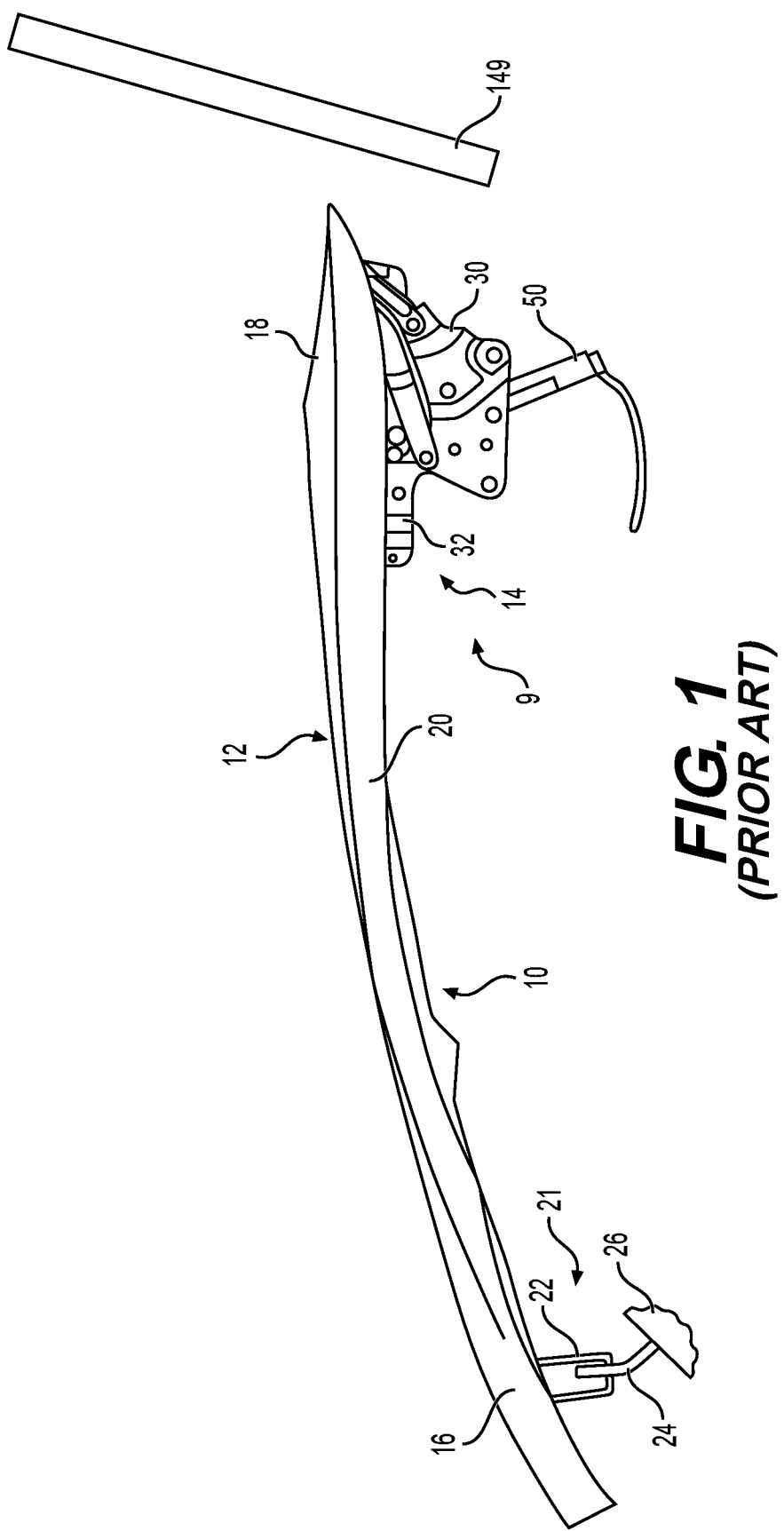
FIG. 1 is a side view of a known vehicle hood assembly having a hood and an active hinge and showing the vehicle hood assembly located in a normal-closed position with the hood in a latched condition and the active hinge in a non-deployed condition.
Figure 2:
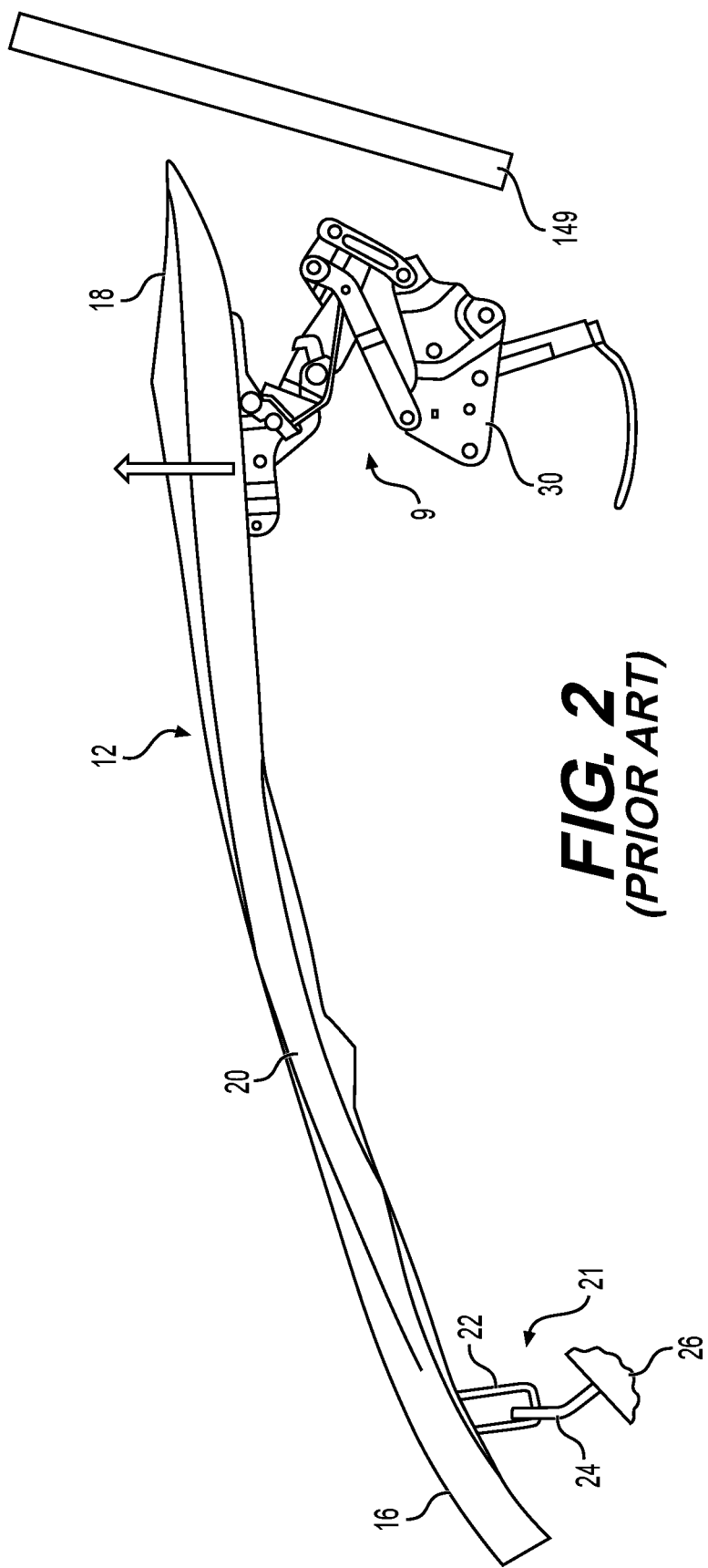
FIG. 2 is a similar side view as FIG. 1, now showing the vehicle hood assembly in a deployed position with the hood maintained in its latched condition and its rear edge segment raised and with the active hinge in a deployed condition.

FIGS. 1 and 2 illustrate a side elevation view of a known vehicle hood assembly 10 generally configured to include a hood 12 and at least one active hinge 9. The term "vehicle" is intended to broadly encompass any car, truck, SUV, van or any other type of passenger carrying vehicle. Hood assembly 10 is configured to overlie an engine compartment of the vehicle, as defined by the vehicle's body. Hood 12 is shown to include a front segment 16, a rear segment 18 and a pair of laterally-spaced side segments 20. As is conventional, front segment 16 of hood 12 is configured to be located proximate to a front portion of the vehicle while rear segment 18 of hood 12 is configured to be located proximate to the vehicle's windshield 149.

In accordance with one example embodiment, a pair of the active hinges 9 (only one shown) are associated with hood assembly 10, each being located adjacent to one of the side segments 20 of hood 12 and being configured to allow hood 12 to pivot between an open position with front segment 16 elevated to provide access to engine compartment and a normal-closed position whereat hood 12 is lowered to provide an unobstructed view for the person operating the vehicle. FIG. 1 illustrates active hinge 9 positioned such that hood 12 pivots in proximity to its rear segment 18. The vehicle is also equipped with a hood latching device 21 shown to include a striker 22 fixed to an underside portion of front segment 16 of hood 12 and a latch 24 mounted to a structural portion 26 of the vehicle's body. In particular, FIG. 1 illustrates striker 22 engaged and held by latch 24 so as to locate the hood assembly 10 in its normal-closed position with active hinge 9 maintained in a "non-deployed" condition, whereby front segment 16 of hood is latched and rear segment 18 of hood 12 is located in its conventional lowered position.

As will be detailed, active hinge 9 includes a pedestrian protection device that functions automatically in the event of a vehicle impact with a pedestrian. Specifically, the pedestrian protection device functions to shift active hinge 9 from its non-deployed mode into a deployed (pedestrian protection) mode, as shown in FIG. 2, where rear segment 18 of hood 12 is moved to a raised or deployed position while front segment 16 of hood 12 remains latched via latching device 21. Thus, active hinge 9 provides an additional degree of freedom in its movement to permit rear segment 18 of hood 12 to move from its normal lowered position (FIG. 1) into its raised position (FIG. 2). As will also be detailed, under normal (i.e., pre-collision) situations, this additional degree of freedom is disabled by a primary latch of a latching mechanism associated with active hinge 9 which, in turn, permits normal usage of hood 12. Normal usage is understood to mean pivotal movement of hood 12 between its normally-closed position of FIG. 1 and a normally-opened position (not shown) with active hinge 9 maintained in its non-deployed state. Release of the primary latch (via an actuator) functions to initiate shifting of active hinge 9 from its normal mode to its deployed mode.

Figure 3:
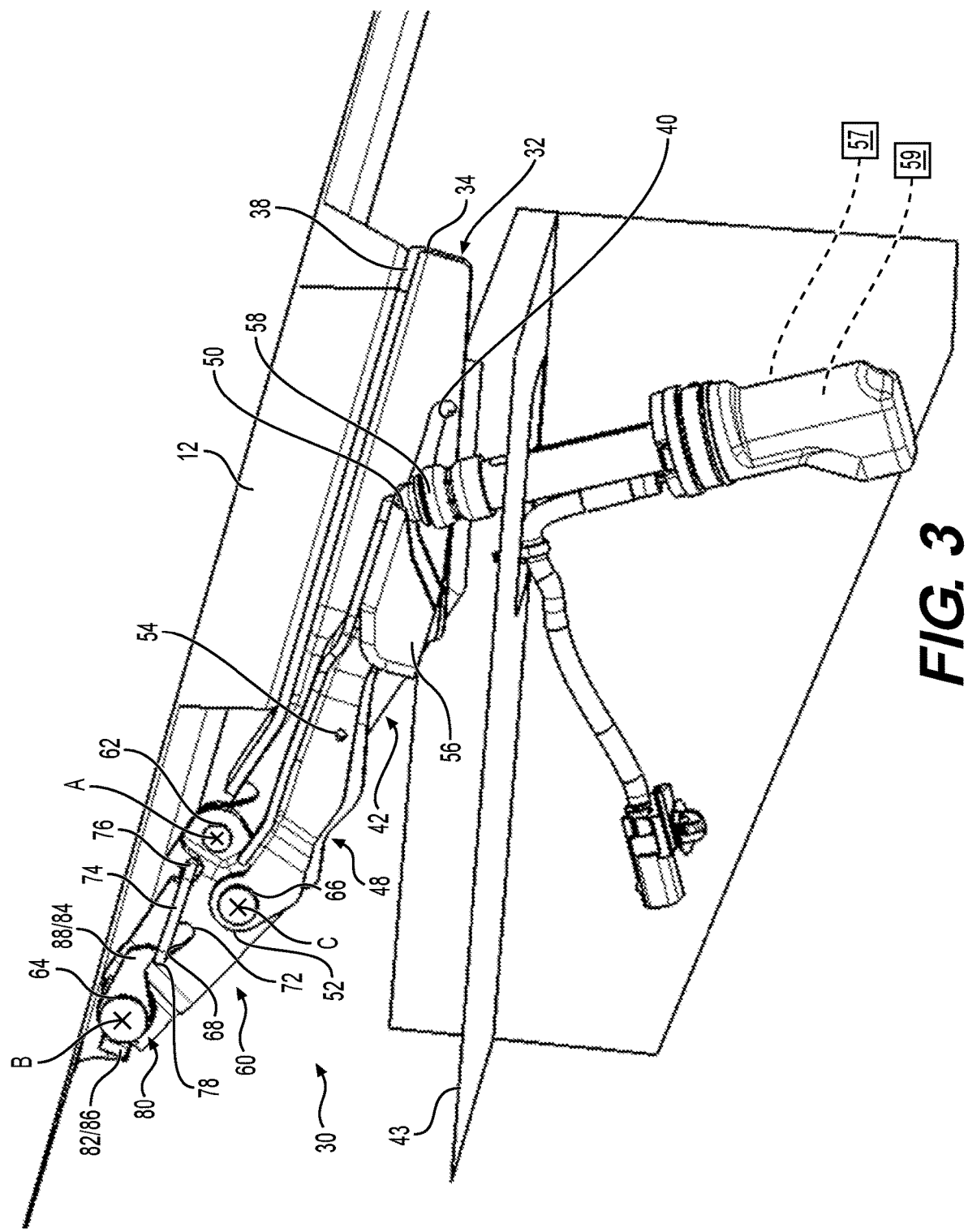
FIG. 3 is a side perspective view of a first embodiment of an improved active hinge.

FIGS. 3-15 present a first embodiment of an improved active hinge assembly 30 (or "active hinge"). As best shown in FIGS. 3 and 11, the active hinge 30 includes a hood bracket 32 for attachment to the vehicle hood 12. The hood bracket 32 extends between a forward/distal end 34 (toward a front of the vehicle) and a rearward/proximal end 36 (toward a rear of the vehicle). The hood bracket 32 includes an upper platform 38 for being coupled with the vehicle hood 12. The hood bracket 32 also defines a guide slot 40 adjacent to the forward end 34. The guide slot 40 extends in a generally arc-shaped path.

Figure 4A:
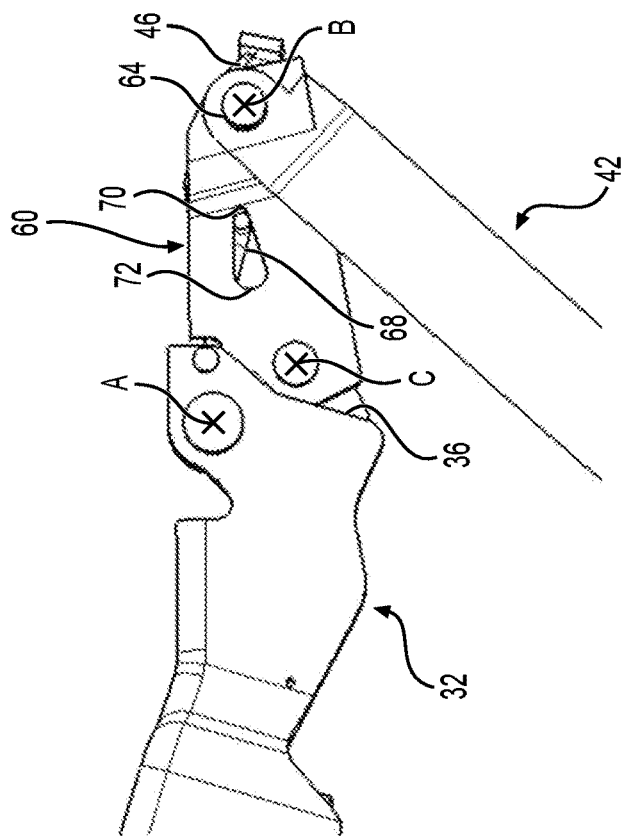
FIG. 4A is a side, perspective magnified view of an upstop lever of the first embodiment of the active hinge, illustrating the upstop lever engaging a body bracket to limit rotation of the vehicle hood relative to the body bracket during the normal hood opening operation.
Figure 4:
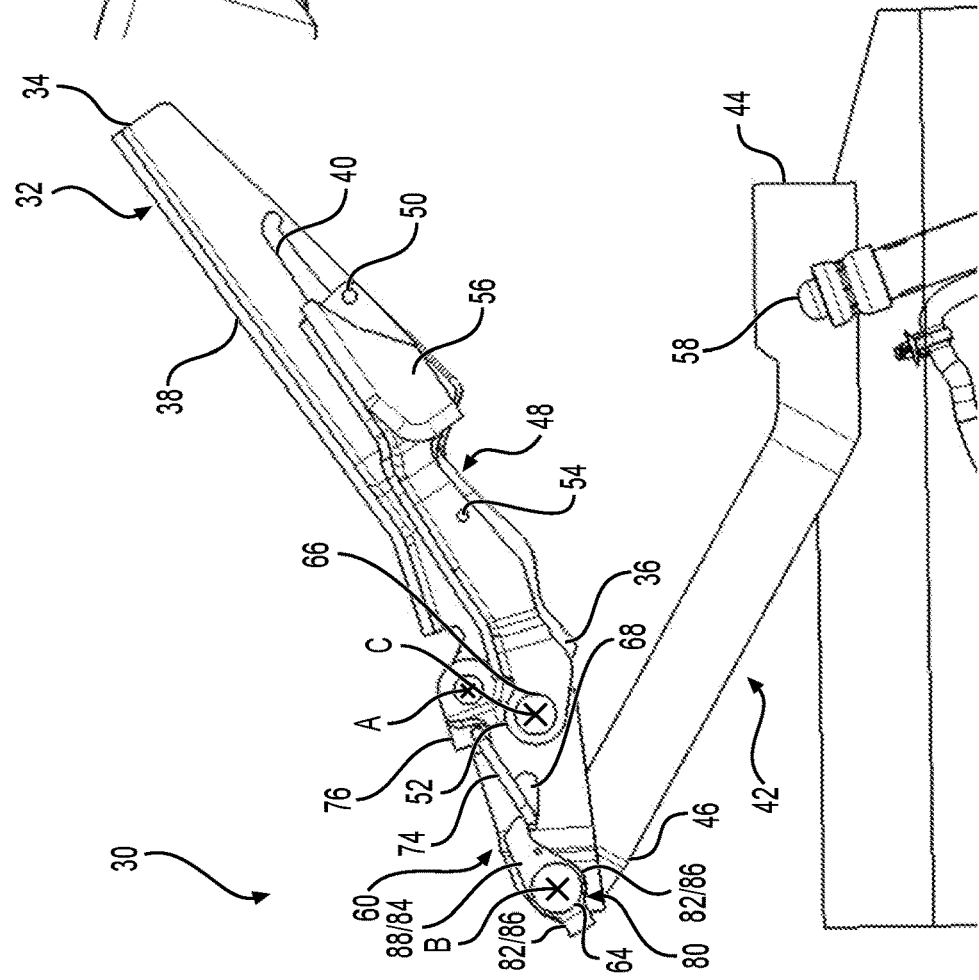
FIG. 4 is a side view of the first embodiment of the active hinge in an open position during a normal hood opening operation.

As best shown in FIG. 4, a body bracket 42 is provided for attachment to the vehicle body 43. The body bracket 42 extends between a front end 44 and a rear end 46, with the front end 44 connected to the vehicle body.

Figure 16:
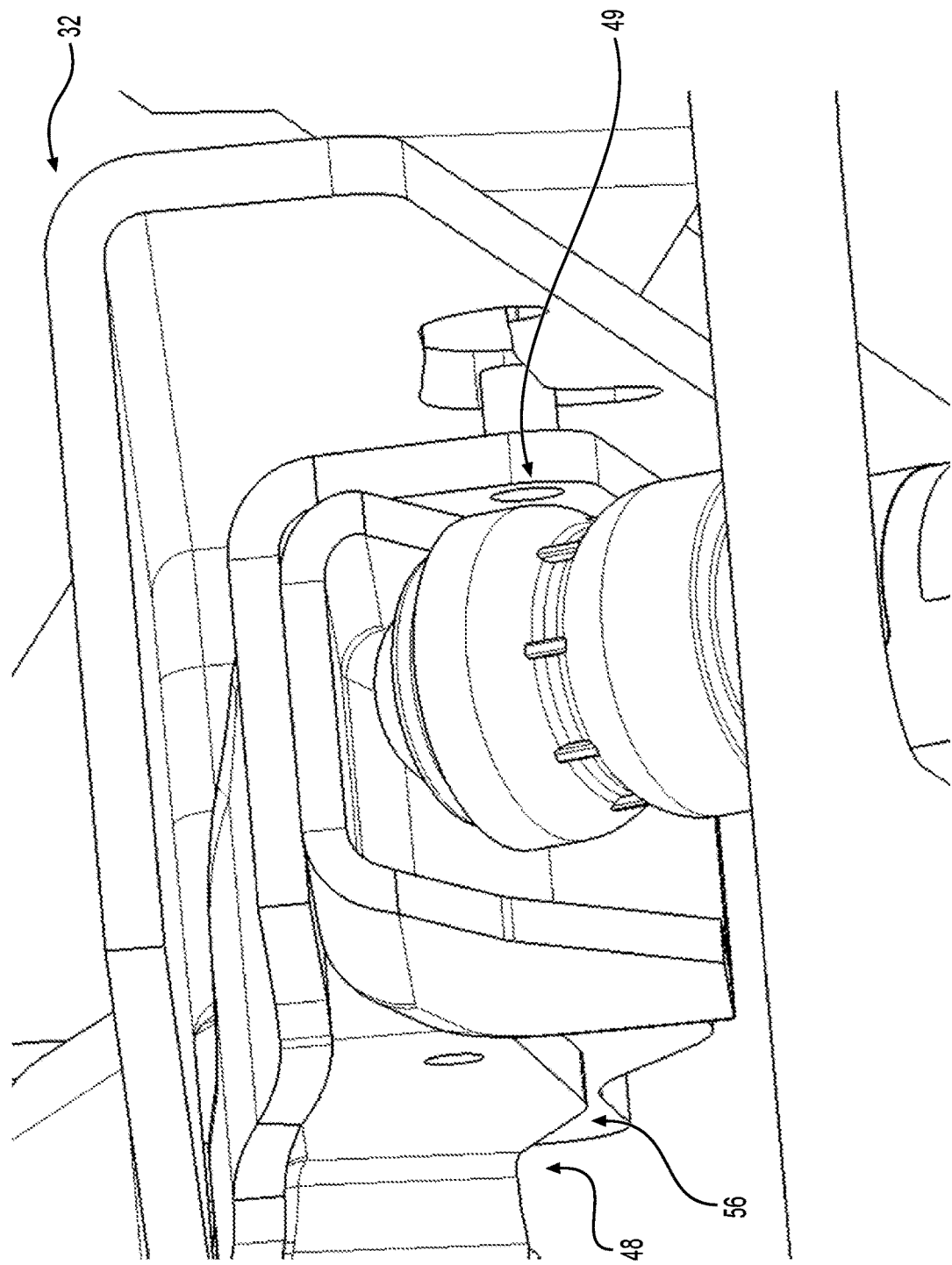
FIG. 16 shows a front perspective view of the first embodiment of the active hinge.

With continued reference to FIG. 4, a deploy bracket 48 overlies a side of the hood bracket 32. The deploy bracket 48 extends between a first end 50 and a second end 52. The deploy bracket 48 includes a guide stud 49 protruding from a side of the deploy bracket 48 adjacent to the second end 52. The guide stud 49 is received by the guide slot 40 of the hood bracket 32 for sliding therein for facilitating movement of the deploy bracket 48 relative to the hood bracket 32. Furthermore, a rivet 54 couples the hood bracket 32 to the deploy bracket 48 such that during normal use of the vehicle hood 12, the deploy bracket 48 is fixed to the hood bracket 32. An actuation flange 56 extends from a side of the deploy bracket 48 (see FIG. 16) opposite the guide stud 49 adjacent to the first end 50. Actuation flange 56 is shown as supported to the deploy bracket 48 by the stud 49.

A linearly extendable actuator 58 is aligned with the actuation flange 56 for linearly engaging the actuation flange 56 in response to a detection of a collision event in order to upwardly move the hood bracket 32 into a deployed, pedestrian protection mode and to provide an under-hood crush space. A controller 57 and associated sensors 59 are provided for detecting the collision event and instructing the actuator 58 to fire. Moreover, engagement of the actuation flange 56 by the actuator 58 also breaks the rivet 54 to unfix the hood bracket 32 from the deploy bracket 48 to allow the deploy bracket 48 to pivot relative to the hood bracket 32 and to allow the guide stud of the deploy bracket 48 to move within the guide slot 40.

With reference to FIG. 3, a primary lever (linkage) 60 is rotatably connected to the hood bracket 32 along a first pivot pin 62 along a first axis of rotation A. Moreover, the primary lever 60 is rotatably connected to the body bracket 42 along a second pivot pin 64 along a second axis of rotation B. Additionally, the primary lever 60 is rotatably connected to the deploy bracket 48 along a third pivot pin 66 along a third axis of rotation C.

During normal (pre-deployment of the actuator 58) use of the vehicle hood 12, while the active hinge 30 is in the normal mode, the rivet 54 which fixes the deploy bracket 48 to the hood bracket 32 is intact. The hood bracket 32 is also fixed relative to the deploy bracket 48. This provides the generally linear arrangement of the hood bracket 32, deploy bracket 48 and primary lever 60 shown in FIG. 4. On the other hand, after the rivet 54 has been broken in response to firing of the actuator 58 via instructions from the controller 57 in response to a detection of a collision event by the sensor 59, the hood bracket 32 is able to rotate relative to the primary lever 60 about the first axis of rotation A. This allows the guide stud of the deploy bracket 48 to slide from a first end to a second end of the guide slot 40 of the hood bracket 32. It should be appreciated that pinning the deploy bracket 48 to the hood bracket 32 in this manner provides stiffness to the overall active hinge 30 through normal operation, firing of the actuator 58 and post-firing of the actuator 58 when the active hinge 30 is in the deployed/active pedestrian mode.

As shown in FIG. 3, the primary lever 60 defines a tapered slot 68 that is located between the first axis of rotation A and the second axis of rotation B. The tapered slot 68 has a narrow end 70 that is generally pointed toward the second axis of rotation B and a wider end 72 that is generally pointed toward the first axis of rotation A.

A locking wire 74 extends between the hood bracket 32 and the primary lever 60. More particularly, the locking wire 74 includes a first end 76 that is rotatably connected to the hood bracket 32 adjacent to the first axis of rotation A, and a second end 78 that is received in the tapered slot 68 of the primary lever 60. The second end 78 of the locking wire 74 is moveable between the narrow and wider ends 70, 72 of the tapered slot 68 depending on whether the actuator 58 has been fired in response to a collision event. More particularly, the second end 78 of the wire 74 is located in the narrow end 70 of the tapered slot 68 when the active hinge 30 is in the normal mode when the guide stud 49 of the deploy bracket 48 is in the locked position, and is located in the wider end 72 of the tapered slot 68 in response to rotation of the hood bracket 32 relative to the primary lever 60 about the first axis of rotation A during movent of the active hinge 30 into the deployed mode.

An upstop lever (linkage) 80 is rotatably connected to the primary lever 60 and to the body bracket 42 along the second pivot pin 64 and second axis of rotation B. The upstop lever 80 extends between a first end 82 and a second end 84 on opposite sides of the second pivot pin 64, and presents a blocking flange 86 at the first end 82 and a locking hook 88 at the second end 84. A biasing element 90 biases the locking hook 88 of the upstop lever 80 in a first direction (the clockwise direction in FIG. 3). During normal operation of the hood 12 when the second end 84 of the locking wire 74 is located at the narrow end 70 of the tapered slot 68, the locking hook 88 is biased against the second end 84 of the locking wire 88. Tolerance compensation is achieved because the locking wire 74 can bow slightly to create pressure into the narrow end 70. However, after movement of the locking wire 74 from the narrow end 70 to the wider end 72 in response to firing of the actuator 58 during a collision event, the locking hook 88 is able to rotate a predetermined extent past the tapered slot 68.

As best shown in FIGS. 4 and 4A, during normal operation of the vehicle hood 12 when the locking hook 88 of the upstop lever 80 engages the locking wire 74, the blocking flange 86 of the upstop lever 80 is positioned such that it engages the rear end 46 of the body bracket 42. This limits rotation of the primary lever 60 and hood bracket 32 relative to the body bracket 42 to a first extent, thus providing normal opening and closing of the vehicle hood 12. On the other hand, as shown in FIG. 11, after firing of the actuator 58 in response to a detected collision event and movement of the biased locking hook 88 past the locking wire 74 and tapered slot 68, the blocking flange 86 is no longer located in alignment with the rear end 46 of the body bracket 42, thereby allowing additional rotation of the primary lever 60 relative to the body bracket 42 to a second extent. This provides additional upward and rearward movement of the hood 12 to move the active hinge 30 into the deployed mode to provide an increased cushioning effect. As also shown in FIG. 11, during the collision event, the front of the hood 12 is latched to the vehicle body, thus providing the generally downward angled positions of the hood bracket 32 and deploy bracket 48.

Figure 5:
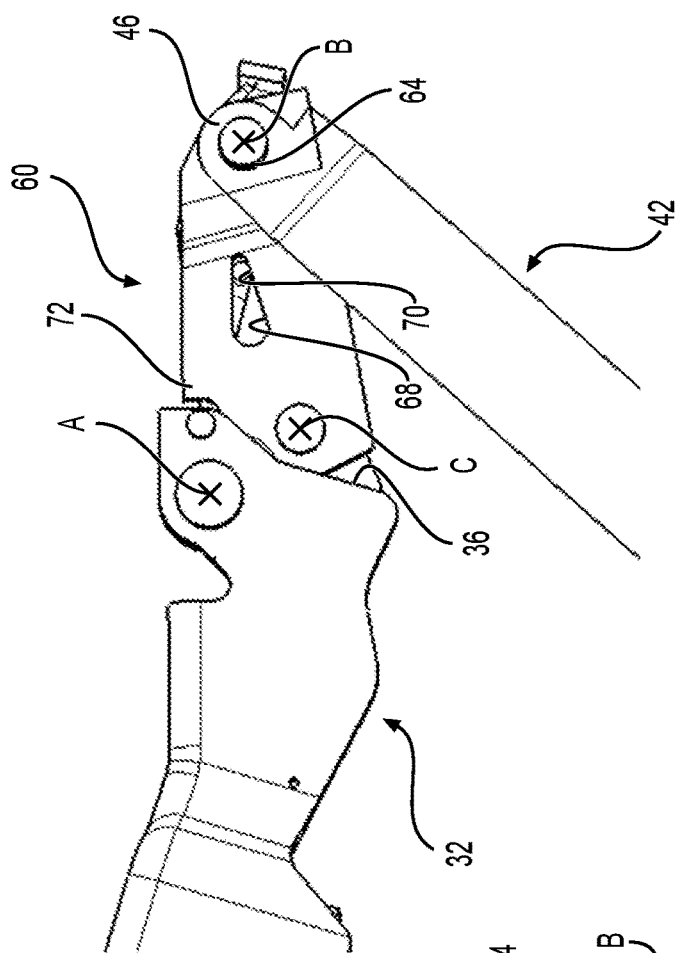
FIG. 5 is another side, perspective magnified view of the first embodiment of the active hinge, illustrating the upstop lever engaging the body bracket.
Figure 6:
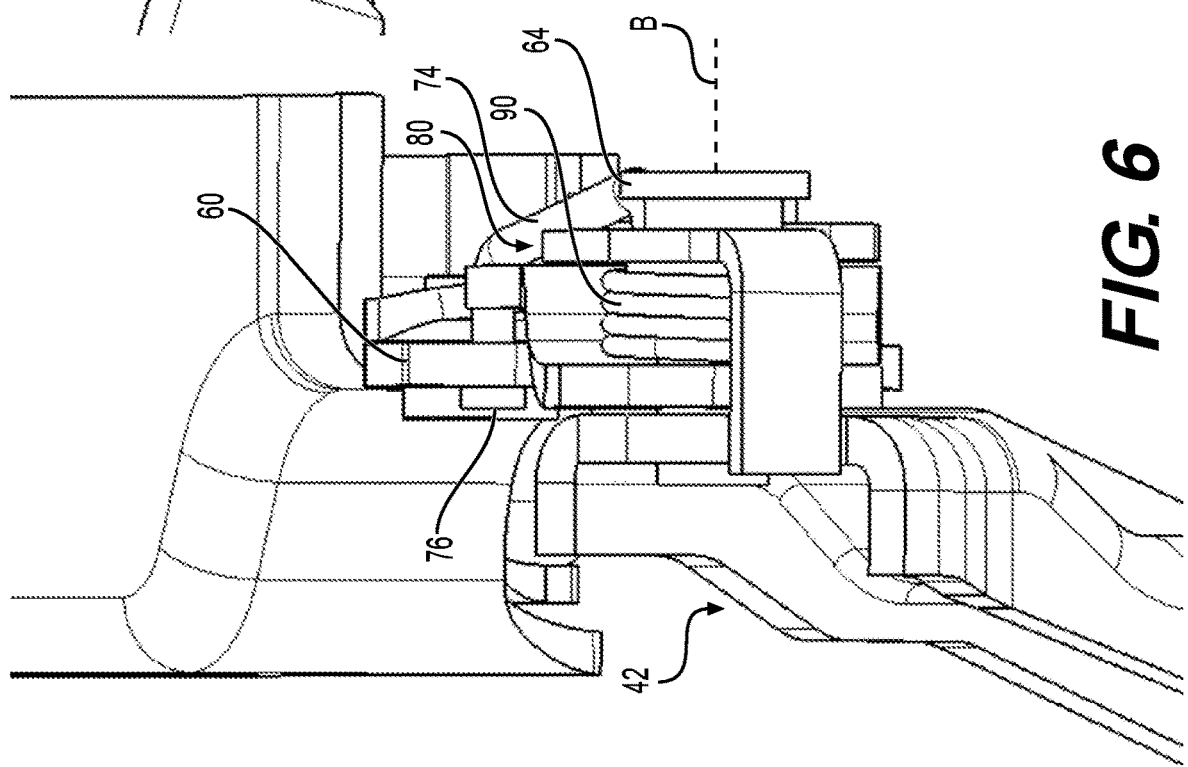
FIG. 6 is a rear view of a locking wire limiting rotation of the upstop lever of the first embodiment of the active hinge during the normal hood opening operation.
Figure 7:
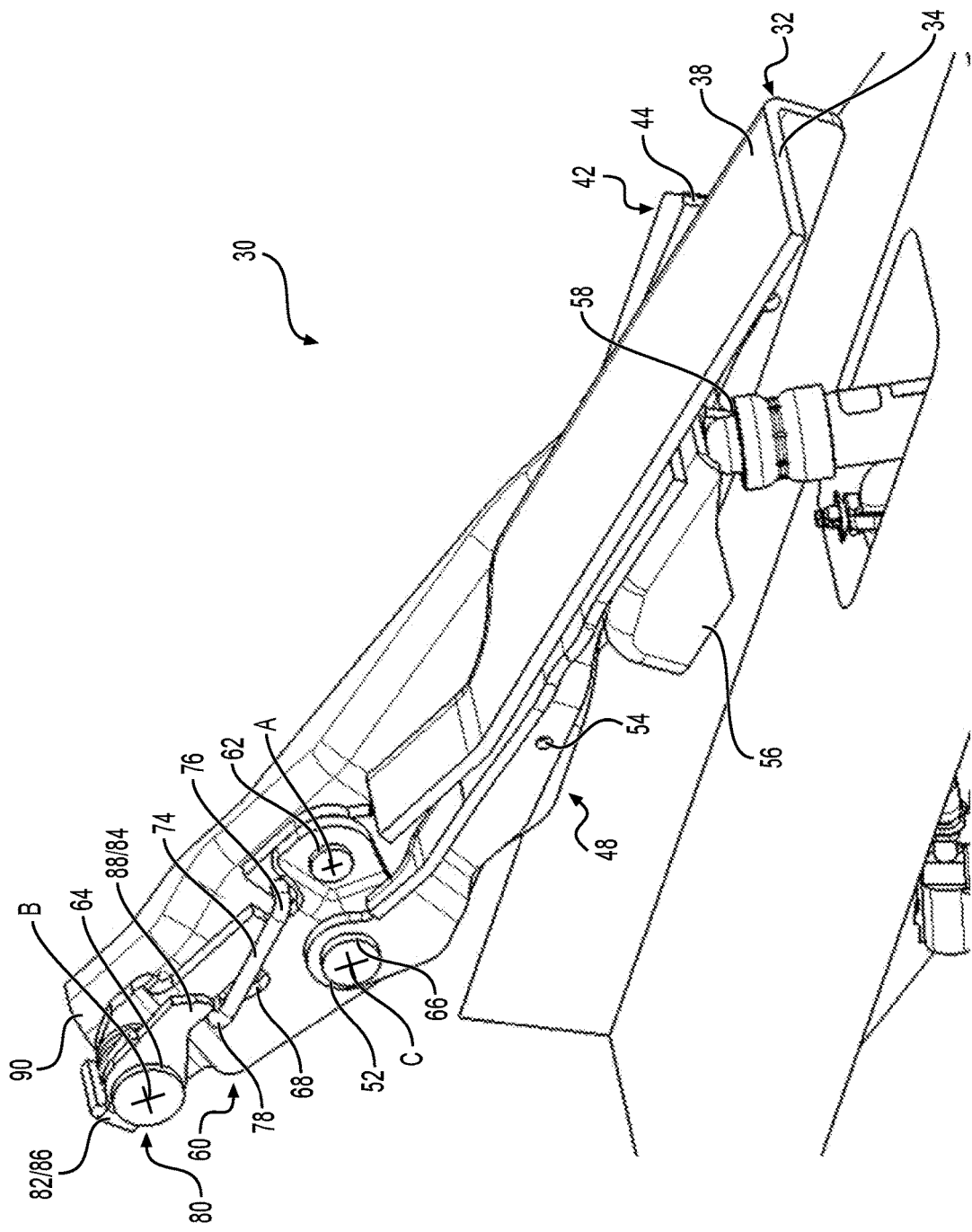
FIG. 7 is a side perspective view of the first embodiment of the active hinge in a closed position.

In summary, FIG. 3 shows the active hinge 30 while the hood 12 is closed during the normal (pre-deployment of the actuator 58) mode of operation of the active hinge 30, and FIGS. 4-6 show the active hinge 30 after opening of the hood 12 during normal mode operation. As illustrated in all of these figures, the hood bracket 32, deploy bracket 48 and primary lever 60 are fixed relative to one another in a generally linear arrangement due to the rivet 54 fixing the deploy bracket 48 to the hood bracket 62. Furthermore, rotation of these components relative to the body bracket 42 is limited due to the engagement of the blocking flange 86 of the upstop lever 80 against the body bracket 42 (also shown in FIG. 12). This provides normal up/down movement of the hood 12. As best illustrated in FIG. 6, the length of the upstop lever 80 and diameter of the locking wire 74 are selected to provide adequate strength to the active hinge assembly 30 during normal opening and closing of the vehicle hood 12.

Figure 8:
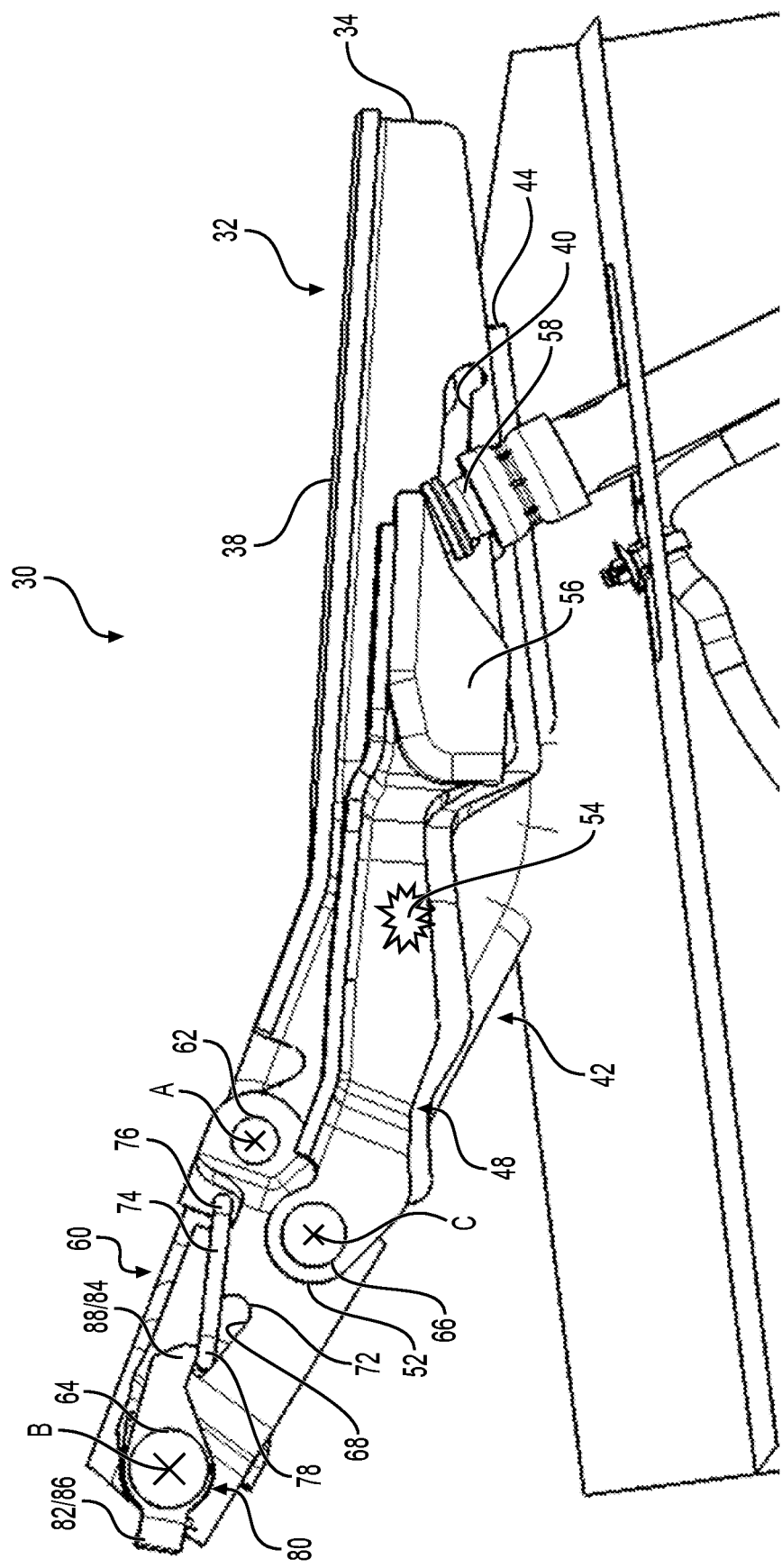
FIG. 8 is a side view of the first embodiment of the active hinge immediately after firing an actuator while being moved into a pedestrian protection (deployed) mode, illustrating breaking of a rivet between the hood bracket and a deploy bracket to allow movement of the hood bracket relative to the deploy bracket.
Figure 9:
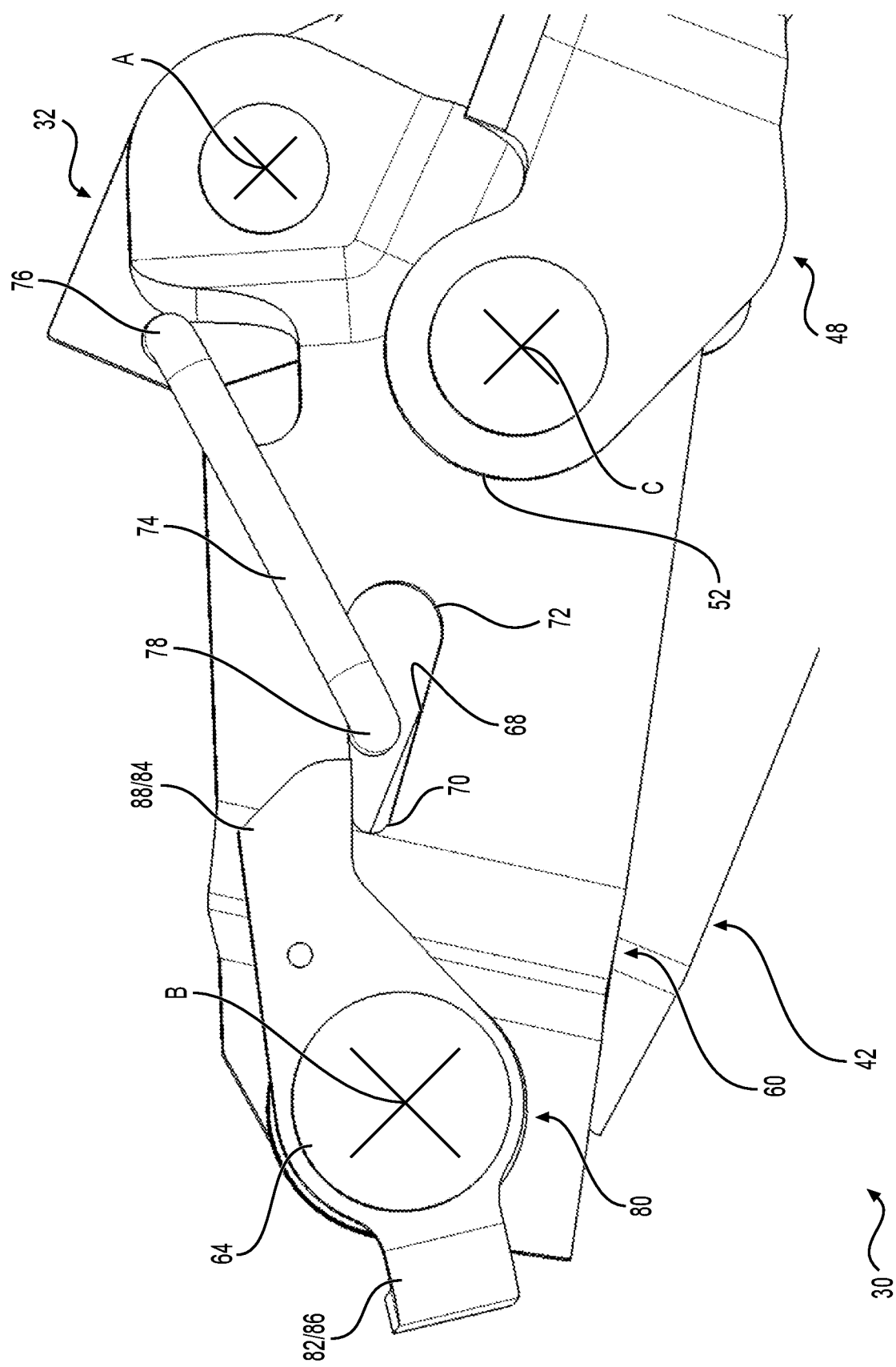
FIG. 9 is a side view of a locking wire of the first embodiment of the active hinge, illustrating the locking wire being moved from a narrow portion of a tapered slot of a primary lever to a wider end of the tapered slot in response to firing of the actuator while the active hinge is moved into the pedestrian protection mode.
Figure 10:
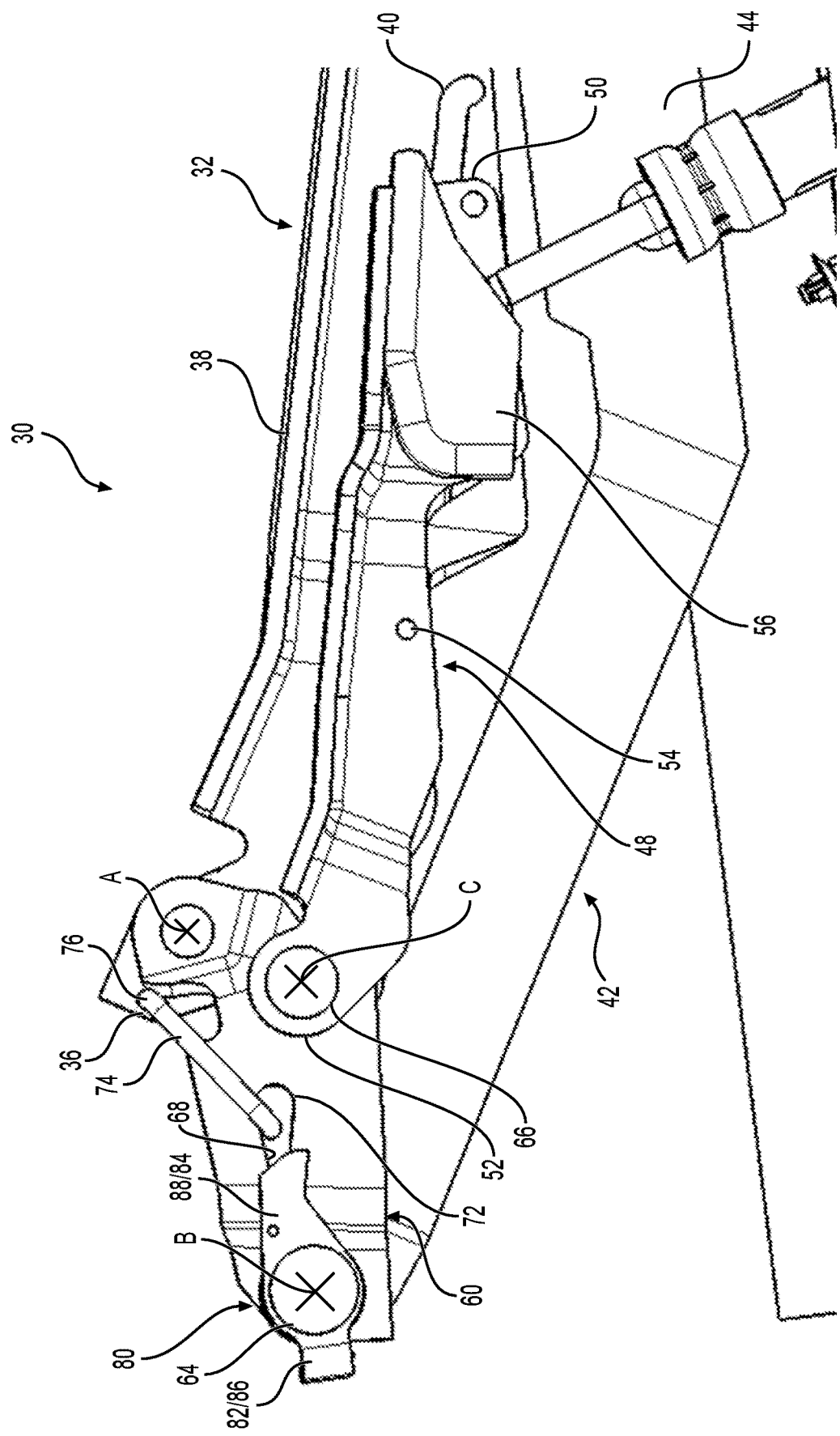
FIG. 10 is a side view of the first embodiment of the active hinge, illustrating movement of the upstop lever, primary lever, hood bracket and deploy bracket while the active hinge moves into the pedestrian protection mode.
Figure 11:
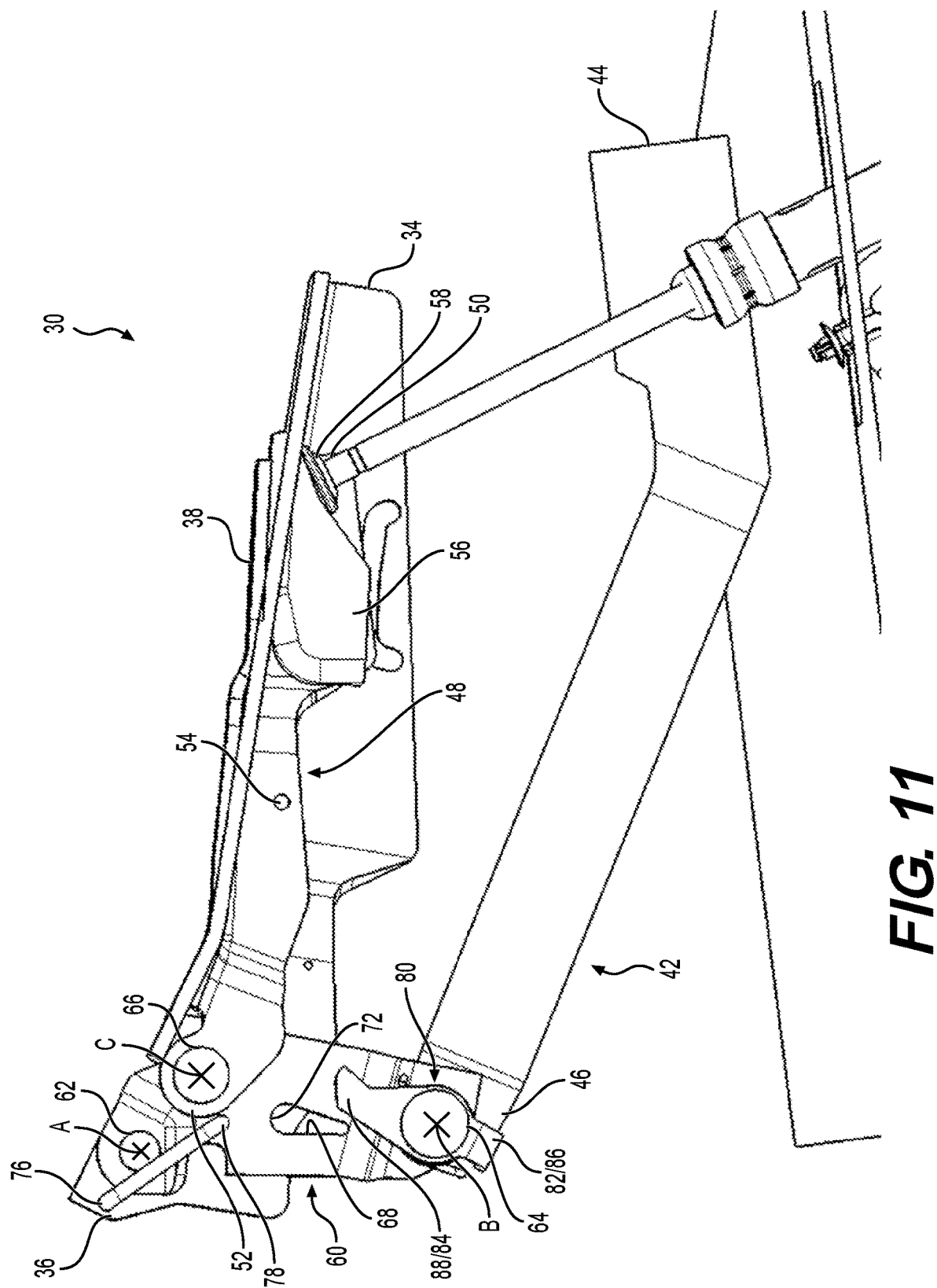
FIG. 11 is a side view of the first embodiment of the active hinge after being deployed into the pedestrian protection mode, illustrating that movement of the deploy bracket is inhibited by engagement of the deploy bracket against the hood bracket.
Figure 12:
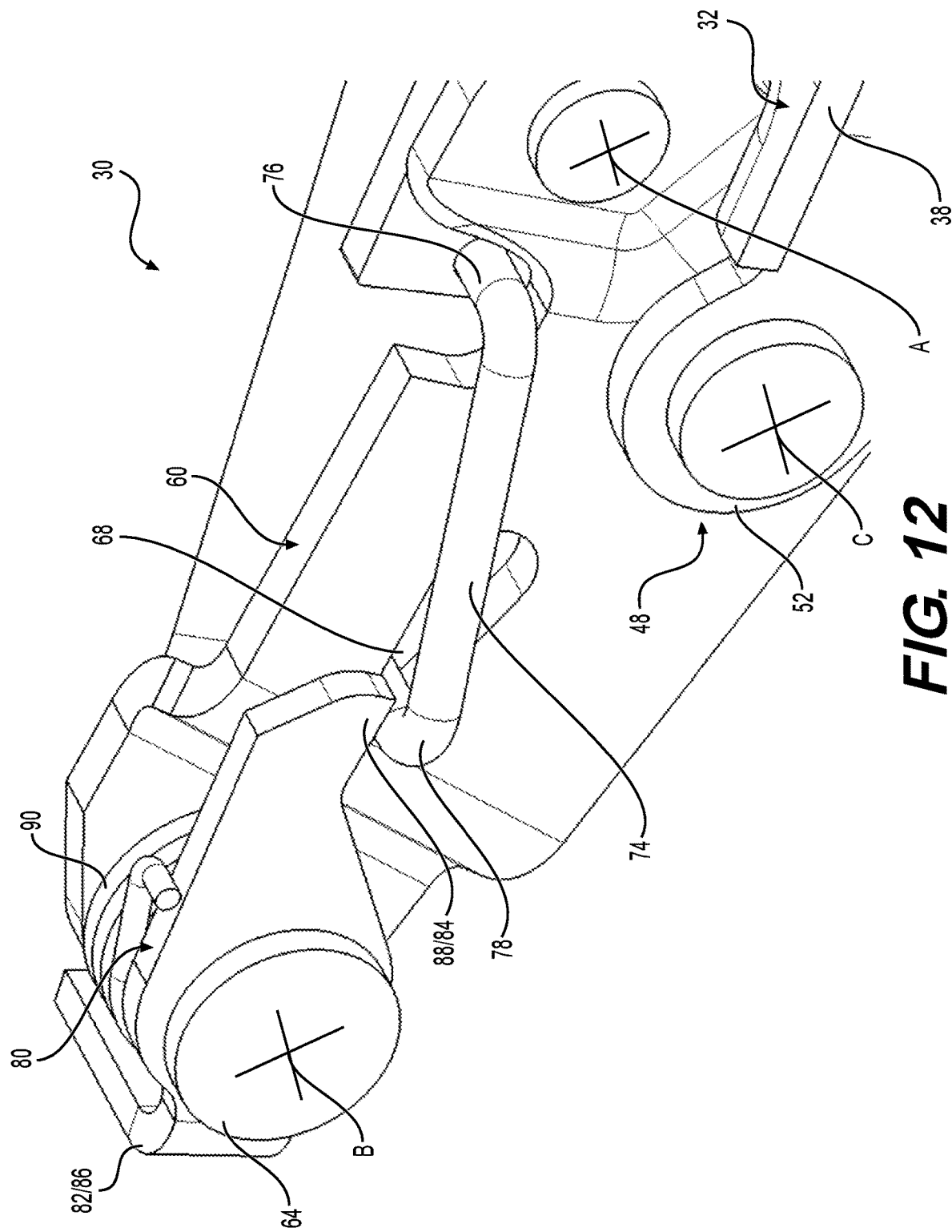
FIG. 12 is a side perspective view of the upstop lever of the first embodiment of the active hinge, illustrating the upstop lever engaging the locking wire prior to activation of the actuator.
Figure 13:
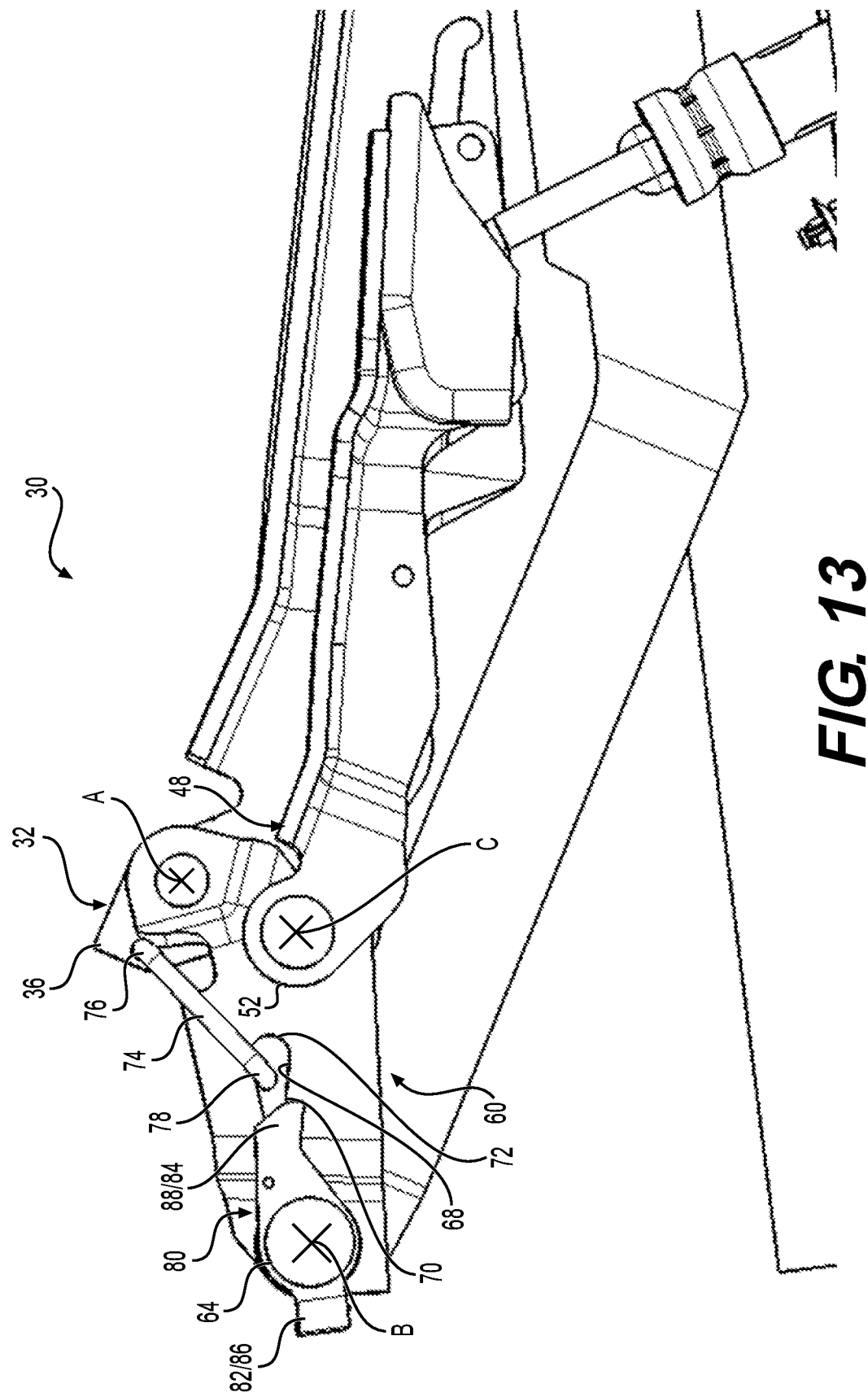
FIG. 13 is a side view of the locking wire of the first embodiment of the active hinge, illustrating the locking wire moving laterally within the tapered slot to provide space for rotation of the upstop lever during moving of the active hinge into the pedestrian protection mode.
Figure 14:
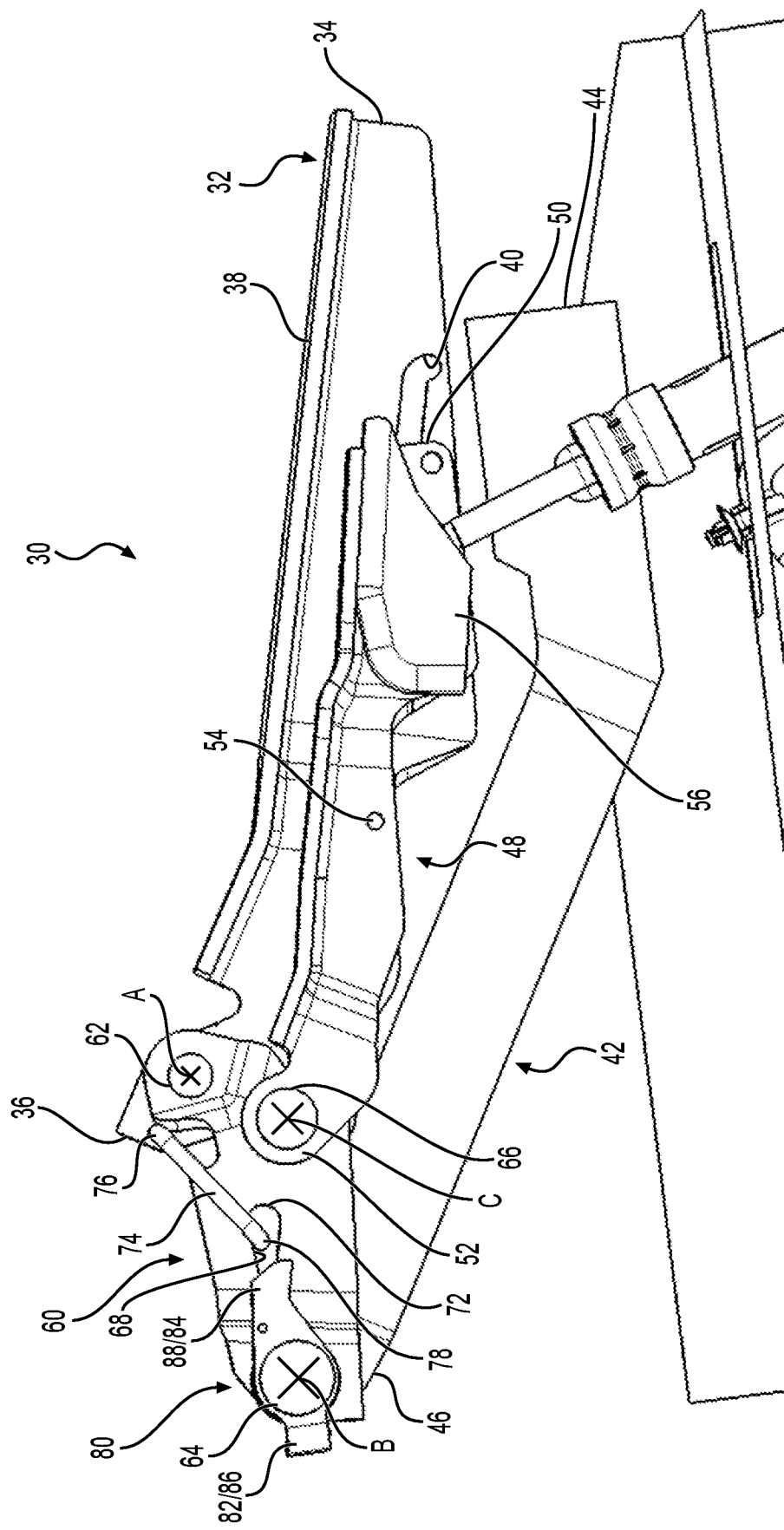
FIG. 14 is a side view of the first embodiment of the active hinge illustrating movement of a guide stud of the deploy bracket within a guide slot of the hood bracket.

FIGS. 7-11 illustrate the various stages of deployment of the active hinge 30 into the pedestrian protection deployed mode of operation after the detection of a collision event. More particularly, FIG. 8 illustrates breaking of the rivet 54 between the hood bracket 32 and deploy bracket 48 after initial movement of the linear actuator 58 against the actuation flange 56 of the deploy bracket 48. FIG. 8 further illustrates that breaking the rivet 54 further allows the deploy bracket 48 to rotate relative to the primary lever 60 about the third axis C of rotation (initially clockwise as shown in FIG. 8). FIG. 9 illustrates that the clockwise rotation of the primary lever 60 relative to the hood bracket 32 pulls the second end 78 of the locking wire 74 from the narrow end 70 of the tapered slot 68 to the wider end 72 of the tapered slot 68. As illustrated in FIG. 10, movement of the locking wire 74 in this manner allows the upstop lever 80 to rotate clockwise past the tapered slot 68, thus moving the blocking flange 86 of the upstop lever 80 out of alignment with the body bracket 42, thereby allowing the primary lever 60 to rotate relative to the body bracket 42 to the second extent, thus allowing greater upward and rearward movement of the hood 12 during the collision event to provide additional cushioning in the deployed mode. FIG. 10 also illustrates that during linear movement of the actuator 58 and associated rotational movement of the hood bracket 32, deploy bracket 48 and primary lever 60, the guide stud travels from one end of the guide slot 40 to the other end of the guide slot 40. FIG. 11 illustrates the active hinge assembly 30 after full deployment. As shown, the primary lever 60 is rotated relative to the body bracket 42 about the second axis of rotation B to its second extent, thus providing additional upward and rearward movement of the hood 12 to provide increased cushioning. Moreover, as shown, the hood bracket 32 is generally angled downwardly toward a front of the vehicle because the front of the hood 12 is latched to the vehicle body. Additionally, as illustrated, upward and rearward movement of the hood bracket 32 is limited by the final rotational locations of the deploy bracket 48 and primary lever 60.

It should also be appreciated that during normal operation, it is desirable to locate the pivot point of the hood 12 as far toward the rear of the vehicle as possible to allow the hood 12 to be opened wide enough to provide access without raising the hood 12 to an extent that users are unable to reach the front tip of the hood 12 to close it without the rear hood tip (closer to the windshield) contacting body panels. Prior assemblies that provide this capability employed multi-bar linkages which required more components than the subject active hinge 30. Because the pivot point of the primary lever 60 at the second axis of rotation B is set back radially far toward the rear of the vehicle, a rotational stop is required before the hood collides with the body of the vehicle to prevent it from being difficult for users to close the hood 12. Furthermore, because the hood 12 adopts a new, generally horizontal, position in the active pedestrian mode, it is not required to limit rotation of the hood 12, therefore rotation of the single primary lever 60 can be maximized by disabling the rotational stopping feature provided by the upstop lever 80. Furthermore, connection of the primary lever 60 to the end of the hood bracket 32 (proximate the vehicle's windshield) allows the hood 12 to move in the rearward direction without requiring the hood 12 to move up very high as governed by rotation of the primary lever 60, as compared to a pivot point in the middle of the hood bracket 32 like most prior hinge assemblies.

Figure 15:
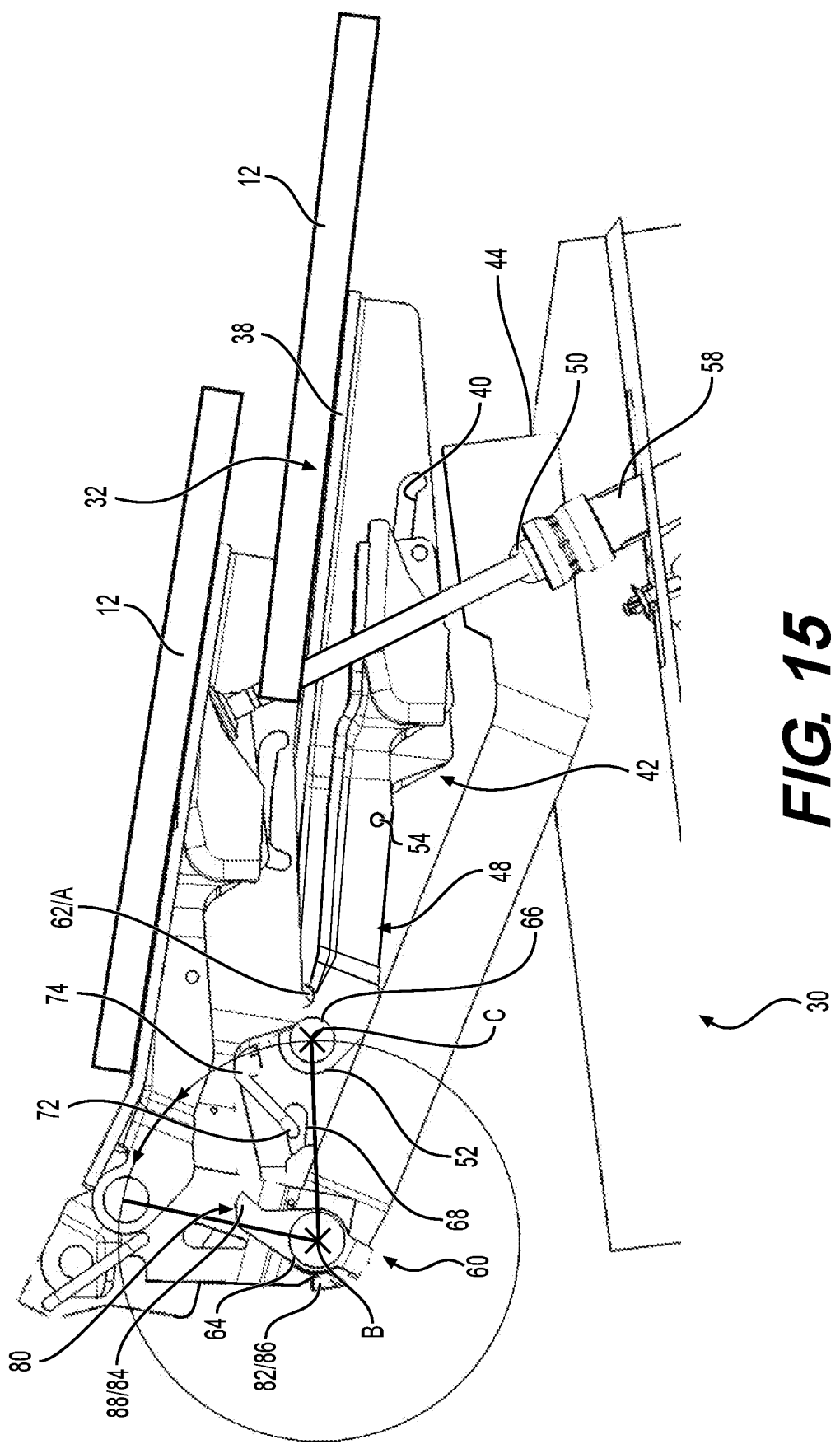
FIG. 15 is a side view of the first embodiment of the active hinge, illustrating a range of movement of the vehicle hood during movement of the active hinge from the normal mode into the pedestrian protection mode.

With reference to FIG. 15 it is illustrated that it is advantages for the distance between the first axis of rotation A connecting the primary lever 60 to the hood bracket 32 and the second axis of rotation B connecting the primary lever 60 and the body bracket 42, to be relatively short compared to the overall length of the hood 12 and body bracket 42 because it prevents the need for excessive upward travel of the hood 12. More particularly, in order to provide rearward movement of the hood 12, the primary lever 60 must first rotate counterclockwise about the second axis of rotation B to its highest position, prior to moving in the rearward direction. By providing a relatively short primary lever 60, it is easier for users to access the hood 12, a smaller actuating piston 58 can be employed, less energy can be used to raise the hood 12, the various linkages may be smaller with less weight, and the active pedestrian mode may be provided quicker.

In summary, the subject active hinge assembly 30 provides a hood 12 that has normal opening operation in a normal/non active pedestrian mode, but has rearward motion during the active pedestrian mode using a single pivot link (primary lever 60) compared to prior complex linkage configurations. The active hinge assembly 30 can advantageously be packed into a small space near the window.

Finally, it should be appreciated that in addition to providing an increased range of upward and rearward movement of the vehicle hood 12 to provide an increased cushion area, the subject active hood hinge assembly 30 also uses few parts and is simple in design and functionality as it only requires two brackets and two primary pivot locations.

Figure 17:
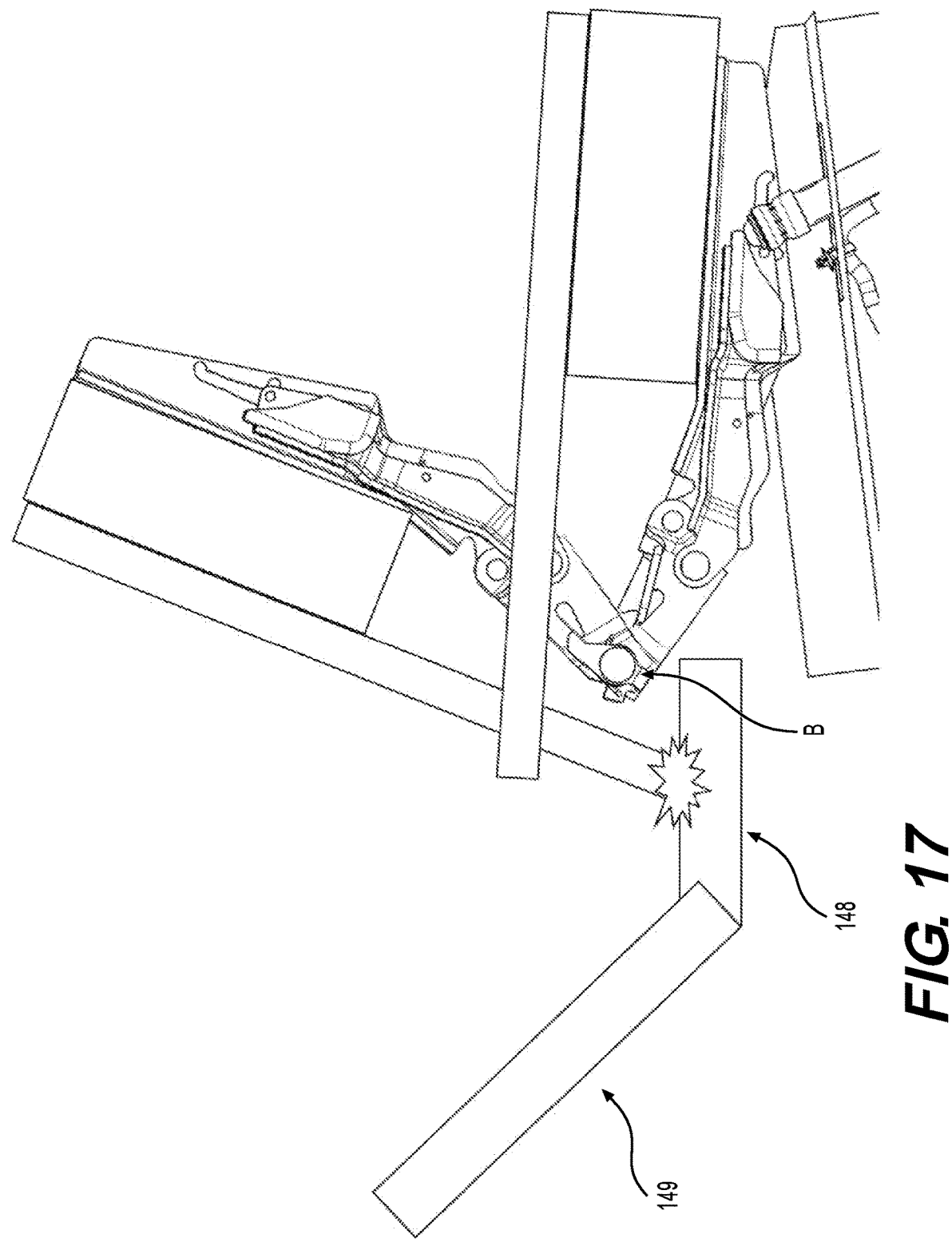
FIG. 17 shows the first embodiment of the active hinge operating in a normal mode.

Now referring to FIG. 17, there is shown an illustrative operation of the active hinge assembly 30 in a normal mode where the hood 12 pivots about axis of rotation B, but is prevented from contacting the surrounding vehicle body e.g., a vehicle body panel, fender 148, windshield motor cover or the like, when in the open position, such as when in the fully opened position in manners as described herein above.

Figure 18:
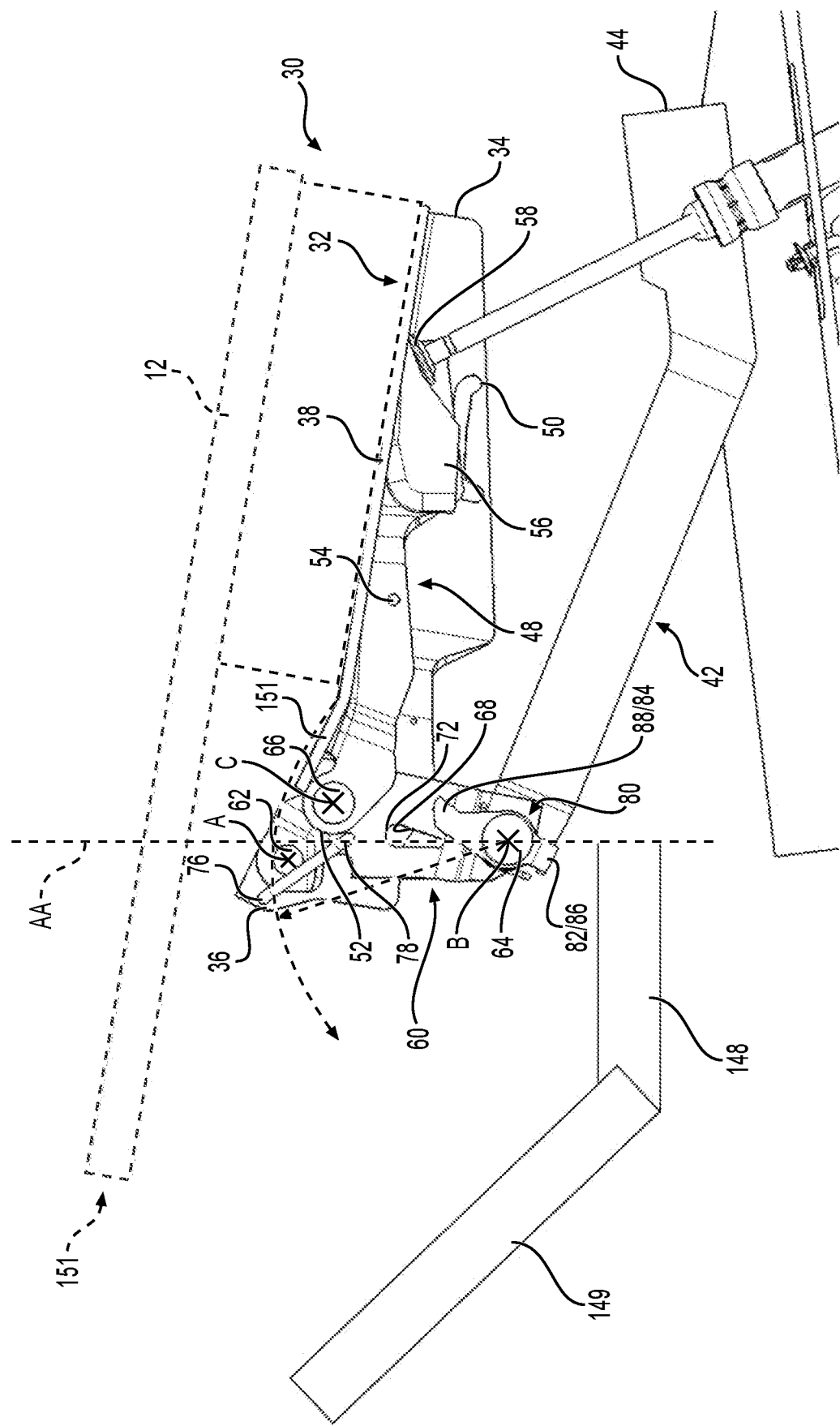
FIG. 18 shows the first embodiment of the active hinge operating in a deployed (pedestrian protection) mode.

Now referring to FIG. 18, there is shown an illustrative operation of the active hinge assembly 30 in the active pedestrian mode where the hood 12 pivots about axis of rotation B, however, the angle of the hood 12 does not remain aligned with primary lever 60 and the rearward tip 151 of the hood 12 is moved upwards to prevent it from contacting the surrounding vehicle body 148 and windshield 149 when moving rearwards after reaching the maximum height shown illustratively at 90 degrees by phantom line YY indicating the inflection point between the rising of the hood 12 as it travels rearwardly and the subsequent falling of the hood 12 as it continues to move rearwardly beyond this inflection angle shown by line YY. Illustratively, tip 151 continues to be able to further move rearwardly without contacting adjacent paneling 148 and the windshield 149 until its motion is stopped by either the a front hood latch (not shown) preventing further rearward motion and/or the active hinge assembly 30 reaching a locking state whereby an upstanding abutment flange 153 extending from the hood bracket 32 abuts bracket 48, effectively collapsing in upon itself. Furthermore, illustratively, primary lever 60 is a single lever.

FIGS. 19-26 present a further embodiment of an improved active hinge assembly (or "active hinge") 230. The active hinge 230 includes a body bracket 232 for attachment to a vehicle body 234 (schematically shown) and a hood bracket 236 for attachment to a vehicle hood 212. The hood bracket 236 extends between a rear end 238 toward the rear portion of the vehicle, and a forward end 240 toward the front of the vehicle. A deploy bracket 242 is rotatably coupled to the hood bracket 236 with a first linkage assembly 244, and is rotatably coupled to the body bracket 232 with a second linkage assembly 246.

Figure 26:
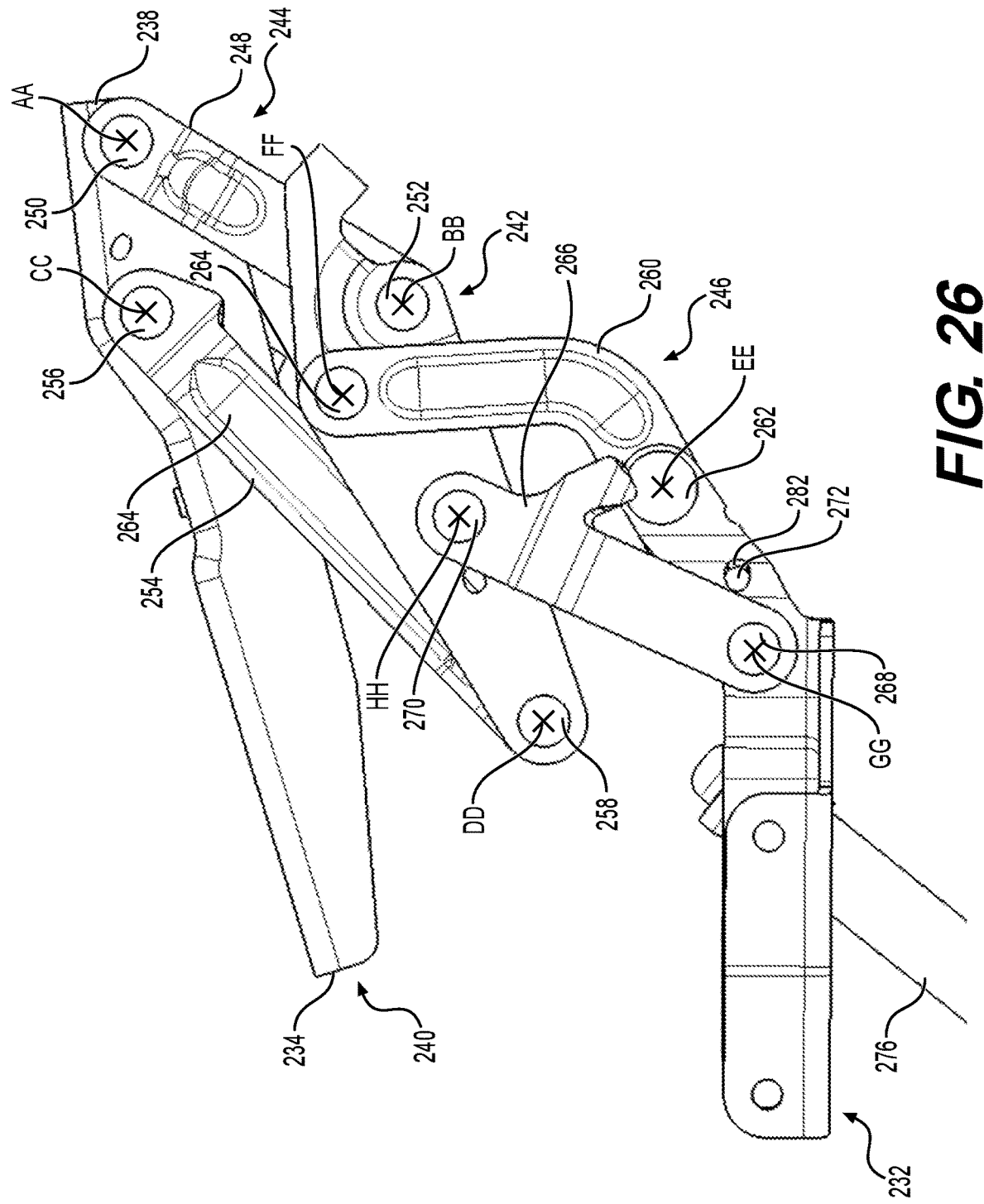
FIG. 26 is a second side view of the second embodiment of the active hinge, illustrating the active hinge in the deployed position.

As best shown in FIG. 26, the first linkage assembly 244 includes a first upper link 248 that is rotatably coupled to the hood bracket 236 at a location adjacent to the rear end 238 of the hood bracket 236 along a first pivot pin 250 and a first axis of rotation AA. The first upper link 248 is also rotatably coupled to the deploy bracket 242 along a second pivot pin 252 and a second axis of rotation BB. The first linkage assembly 244 further includes a second upper link 254 that is rotatably coupled to the hood bracket 236 adjacent to the first pivot pin 250 along a third pivot pin 256 and a third axis of rotation CC. The second upper link 254 is also rotatably coupled to the deploy bracket 242 along a fourth pivot pin 258 and a fourth axis of rotation DD.

The second linkage assembly 246 includes a first lower link 260 rotatably coupled to the body bracket 232 along a fifth pivot pin 262 and a fifth axis of rotation EE. The first lower link 260 is also rotatably coupled to the deploy bracket 242 along a sixth pivot pin 264 and a sixth axis of rotation FF. The second linkage assembly 246 further includes a second lower link 266 rotatably coupled to the body bracket 232 along a seventh pivot pin 268 and a seventh axis of rotation GG. The second lower link 266 is also rotatably coupled to the deploy bracket 242 along an eighth pivot pin 270 and an eighth axis of rotation HH.

As shown, the sixth axis of rotation FF and the eight axis of rotation HH are located between the second axis of rotation BB and the fourth axis of rotation DD on the deploy bracket 42 such that the first and second lower links 260, 266 are located between the first and second upper links 248, 254 on the deploy bracket 242.

Figure 19:
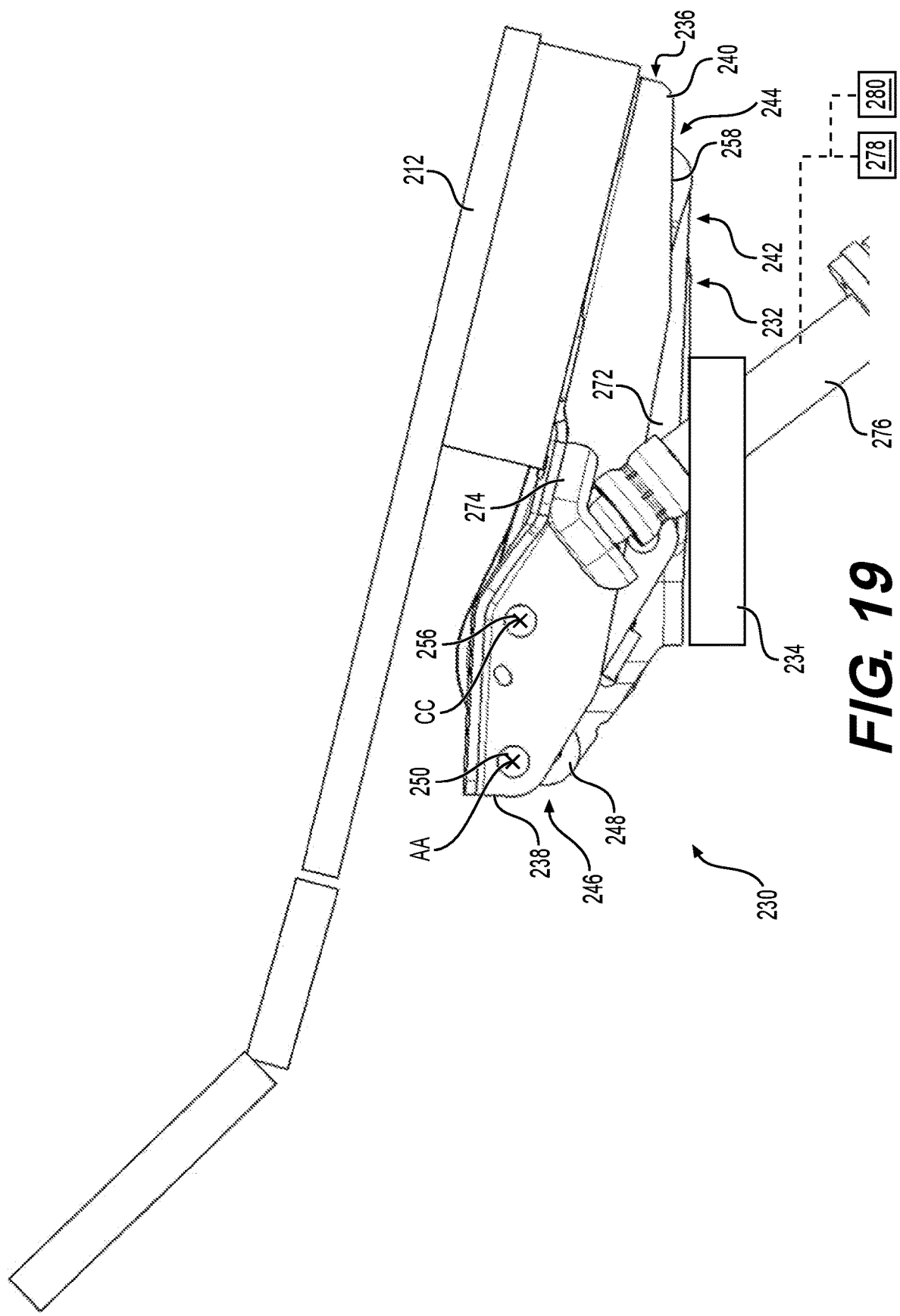
FIG. 19 is a side view of a second embodiment of the active hinge, illustrating the active hinge in an undeployed (normal) mode with the hood closed.
Figure 22:
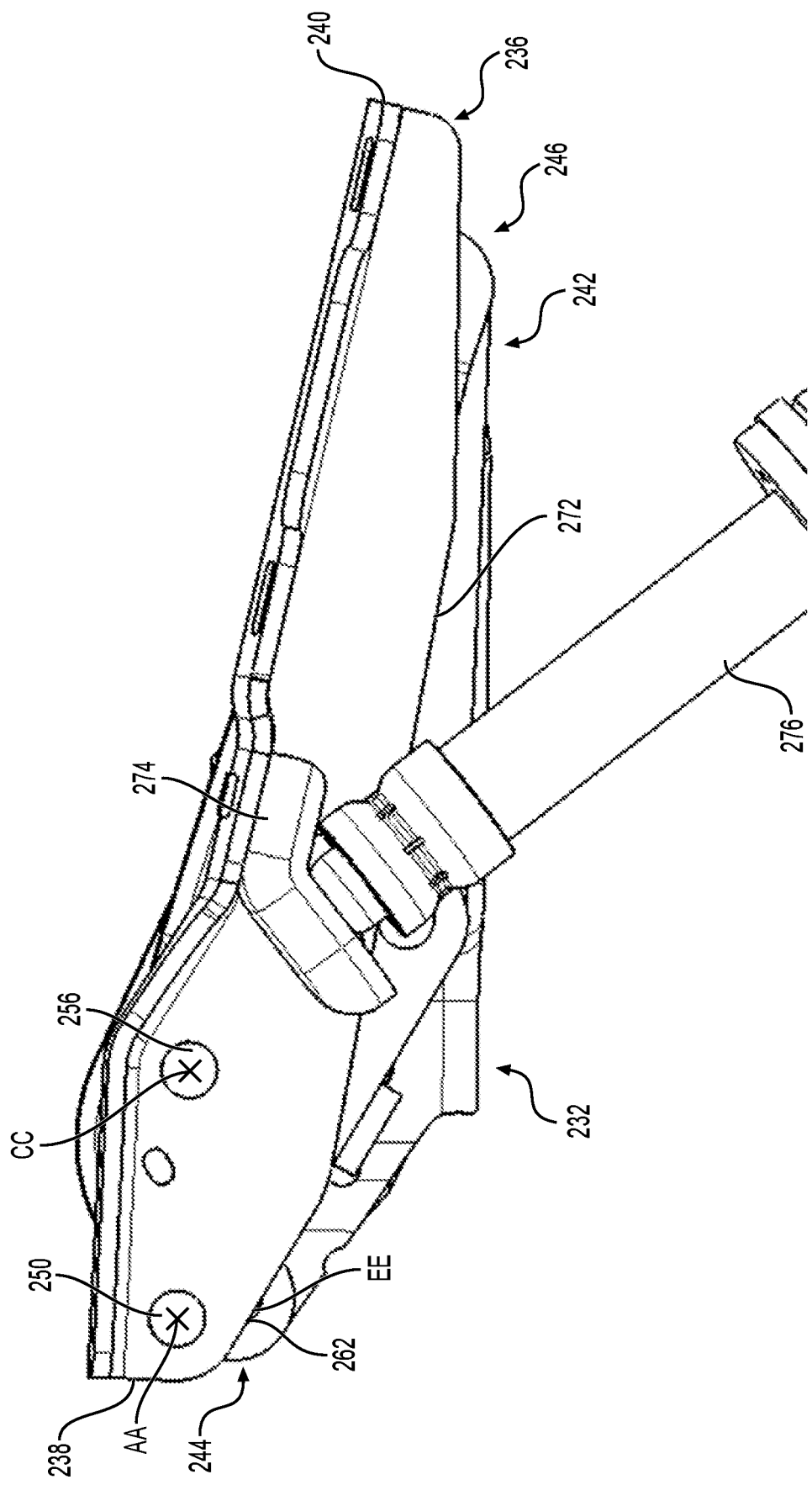
FIG. 22 is a side view of the second embodiment of the active hinge, illustrating the active hinge in the undeployed mode.
Figure 23:
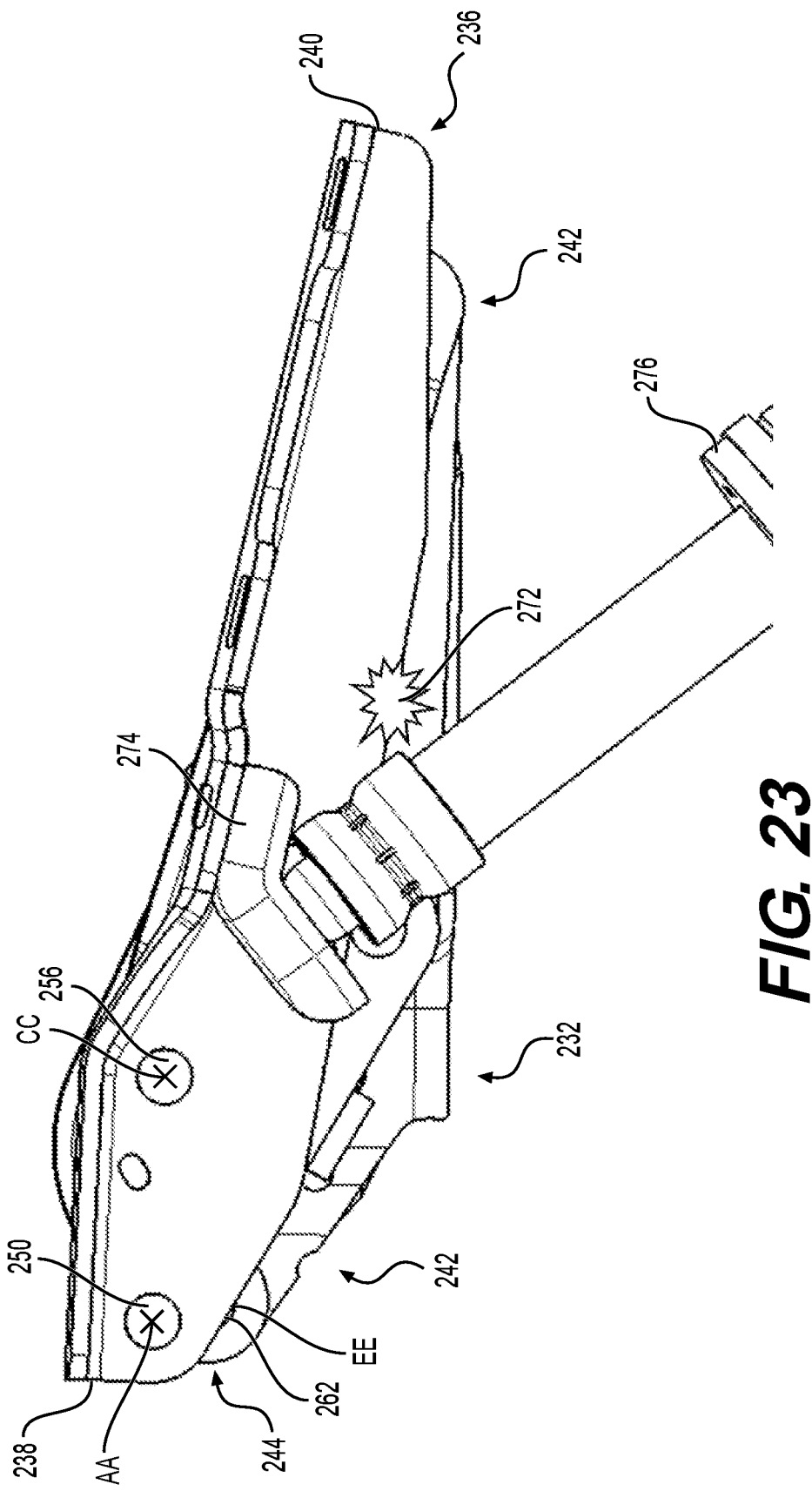
FIG. 23 is a side view of the second embodiment of the active hinge, illustrating breaking of a rivet after firing an actuator during initial movement of the active hinge from the undeployed mode into a deployed (active pedestrian) mode.

As best shown in FIGS. 22-23, a rivet 272 secures the deploy bracket 242 to the hood bracket 236 during normal operation. Furthermore, an engagement flange 274 extends from the hood bracket 236. A linear actuator 276 is connected to the vehicle body 34, and as will be discussed in further detail below, is configured to linearly extend against the engagement flange 274 in response to a detection of a collision event to break the rivet 272 and to drive the deploy bracket 242 and hood bracket 236 upwardly away from the body bracket 232 from an undeployed position into a deployed position (in the active pedestrian mode of the active hinge 230) in order to provide an additional cushion space beneath the hood 212. As shown in FIG. 19, a control system 278 and collision sensor 280 are electrically connected to the actuator 76 for detecting the collision event and instructing the actuator 76 to fire/linearly extend in response to the detection of the collision event to move the active hinge 230 from the normal mode to the deployed mode.

As best shown in FIG. 26, a spring clip 282 is connected to the second lower link 266 and is configured to limit upward movement of the deploy bracket 242 relative to the body bracket 232 by engaging the rivet 272. Furthermore, after the active hinge 230 has moved into the deployed position, the second lower leg 266 engages the rivet 272, thus preventing downward movement of the deploy bracket 242 relative to the body bracket 232. The spring clip 282 may also be configured to separately prevent downward movement of the deploy bracket 242 relative to the body bracket 232 via engagement against the rivet 272 or another feature on the body bracket 232.

Figure 20:
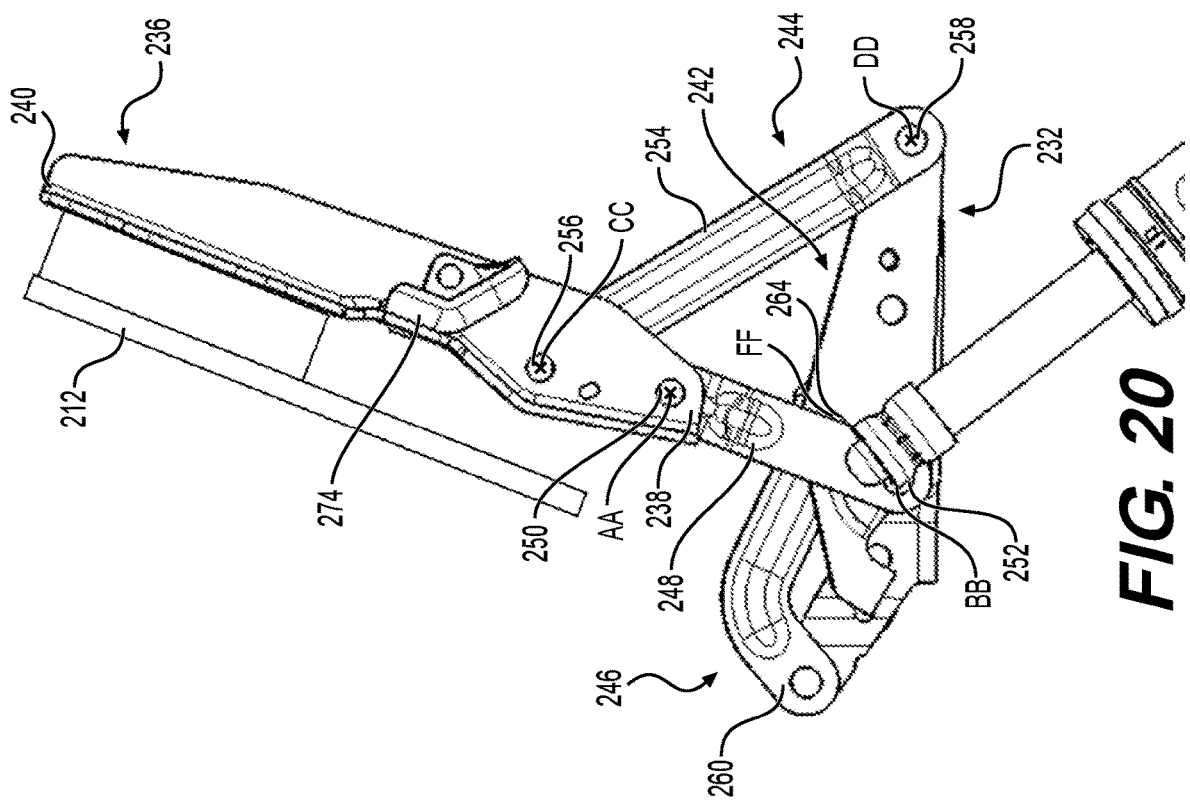
FIG. 20 is a side view of the second embodiment of the active hinge, illustrating the active hinge in the undeployed mode with the hood opened.
Figure 21:
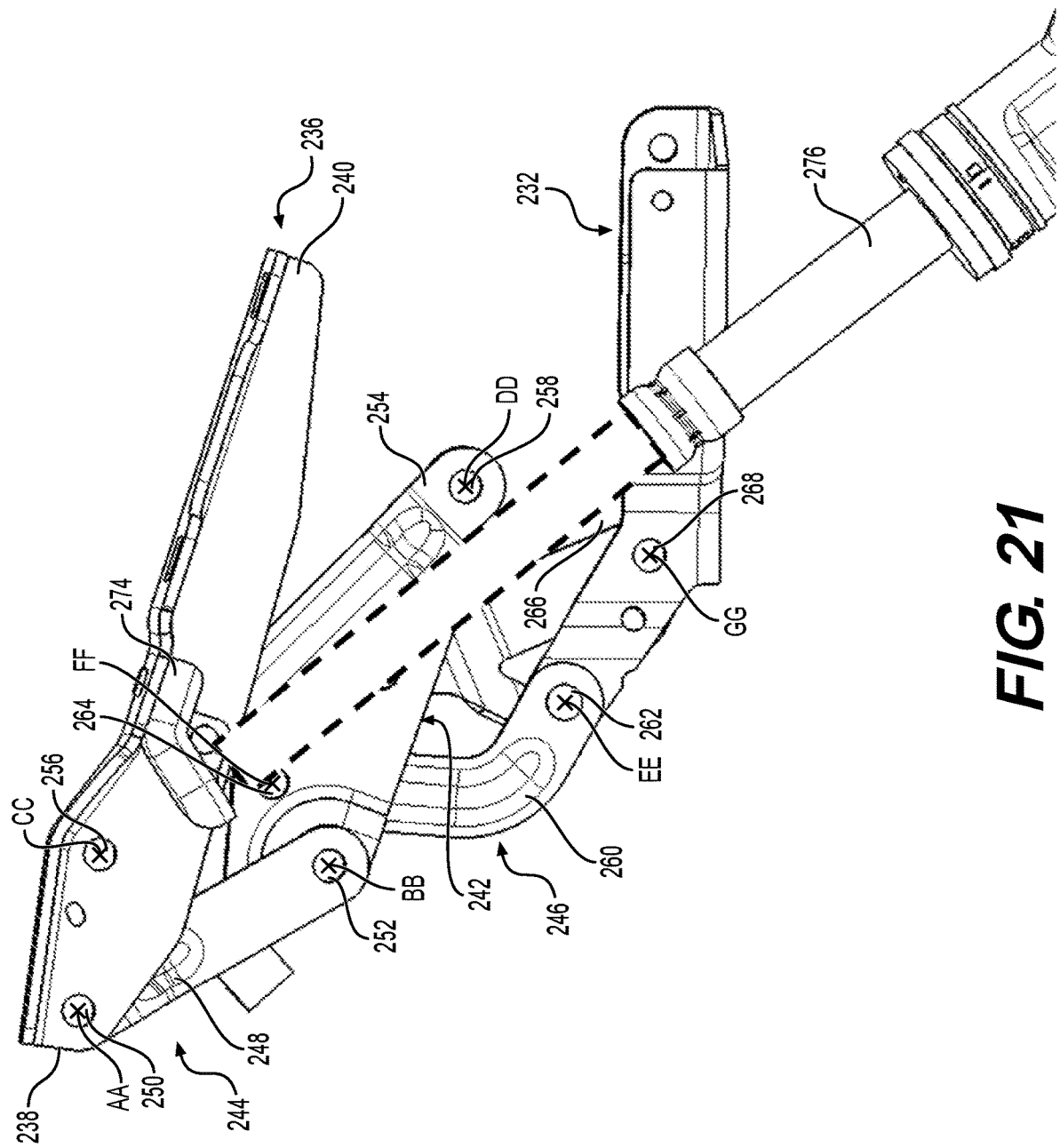
FIG. 21 is a first side view of the second embodiment of the active hinge, illustrating the active hinge in a deployed, active pedestrian mode.

Operation of the active hinge 230 in the normal mode and in the deployed mode after the detection of a collision will now be described. FIG. 19 shows the active hinge 230 in its undeployed, normal operation mode, and the vehicle hood 212 in its closed position. FIG. 20 illustrates the active hinge 230 in its undeployed position after opening of the hood 212. As shown, the deploy bracket 242 is fixed to the body bracket 232 by the rivet 272, thereby permitting the hood bracket 236 to pivot relative to the deploy bracket 242 (and body bracket 232) into its open position along only the first and second upper links 248, 254. In other words, because the rivet 272 secures the deploy bracket 242 to the hood 212, movement of the deploy bracket 242 relative to the body bracket 232 along the first and second lower links 260, 266 is not permitted.

Figure 24:
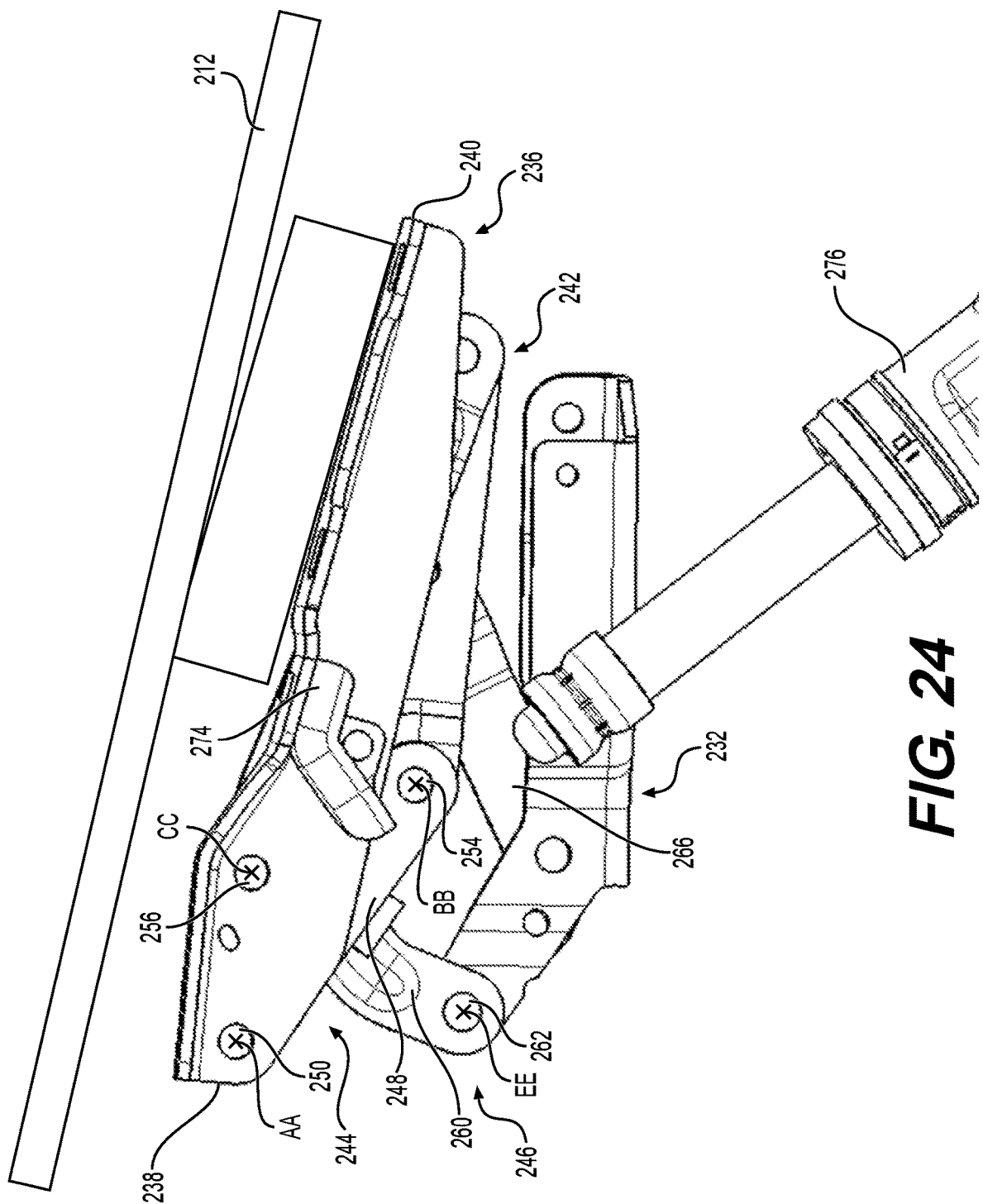
FIG. 24 is a side view of the second embodiment of the active hinge, illustrating the active hinge after movement to a first intermediate position during movement into the deployed mode.
Figure 25:
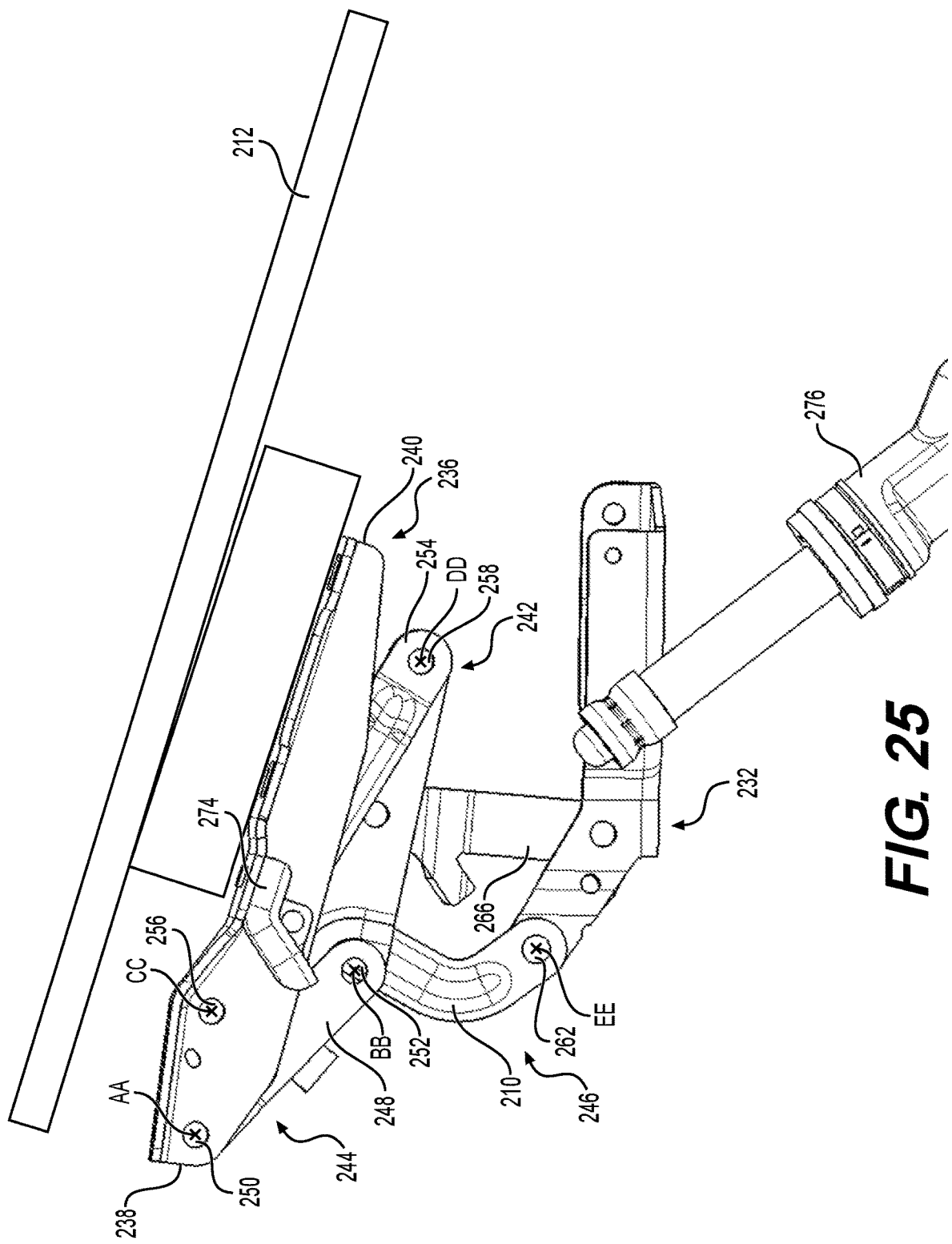
FIG. 25 is a side view of the second embodiment of the active hinge, illustrating the active hinge after movement to a second intermediate position during movement into the deployed mode.

FIGS. 21-26 illustrate deployment of the active hinge 230 from its normal mode into the deployed, active pedestrian mode. More particularly, FIG. 23 shows the active hinge 230 immediately after firing of the actuator 276 in response to a detection of a collision event by the sensor 280. As shown, as a result of the deploy bracket 242 being forced upwardly via contact of the actuator 276 against the engagement flange 274, the rivet 272 breaks, thus allowing movement of the deploy bracket 242 relative to the body bracket 232. FIG. 24 illustrates the active hinge 230 after the actuator 276 has linearly moved to a first intermediate extent. As shown, the deploy bracket 242 (and hood 212) has moved primarily in an upward direction (and slightly in a rearward direction) as a result of the deploy bracket 242 pivoting along the first and second lower links 260, 266 relative to the body bracket 232. FIG. 25 illustrates the active hinge 230 after the actuator 276 has moved to a second intermediate extent. As shown, in addition to the deploy bracket 242 moving primarily in the upward direction, the hood bracket 236 moves in the upward direction and also significantly in the rearward direction relative to the deploy bracket 242 as a result of the hood bracket 236 pivoting along the first and second upper links 248, 254 relative to the deploy bracket 242. FIG. 26 illustrates the active hinge 230 after the actuator 276 has fully extended to its maximum extent. As shown, the hood bracket 236 (and hood 212) have moved in the upward and rearward directions to large extent, thus providing a large cushion space beneath the hood 212. It should be appreciated that the amount of movement in the upward and rearward directions may be adjusted based on lengths of the first and second linkage assembles 246, 246 and brackets and the locations of the various pivot pins.

As further shown in the FIG. 26, after the active hinge 230 is fully extended in the deployed, active pedestrian position, downward movement of the deploy bracket 242 relative to the body bracket 232 is prevented by engagement of the second lower link 266 against the rivet 272. Moreover, upward movement of the deploy bracket 242 past a certain point is inhibited by engagement of the spring clip 282 against the rivet 272.

Accordingly, the subject active hinge 230 provides two separate two-bar linkages 244, 246 that operate in tandem to provide both upward and rearward movement of the vehicle hood 212 in the deployed, active pedestrian mode, thus providing a large cushion space under the hood 212 during pedestrian collision events. Furthermore only the first linkage assembly 244 is required to provide opening and closing of the hood 212 during normal, undeployed use of the active hinge 230.

FIGS. 27-34 present yet another embodiment of an improved active hinge assembly (or "active hinge") 330. The active hinge 330 includes a body bracket 332 for attachment to a vehicle body 334 (schematically shown) and a hood bracket 336 for attachment to a vehicle hood 338 (schematically shown). The body bracket 332 extends between a rear end 340 toward a rear portion of the vehicle, and a front end 342 toward a front portion of the vehicle. Likewise, the hood bracket 336 extends between a rear end 344 toward the rear portion of the vehicle, and a front end 346 toward the front of the vehicle. A deploy bracket 348 is rotatably coupled to the hood bracket 336 about a first pivot pin 350 located alone a first axis AAA. The deploy bracket 350 also extends between a rear end 352 toward the rear portion of the vehicle and a front end 354 toward the front of the vehicle.

Figure 27:
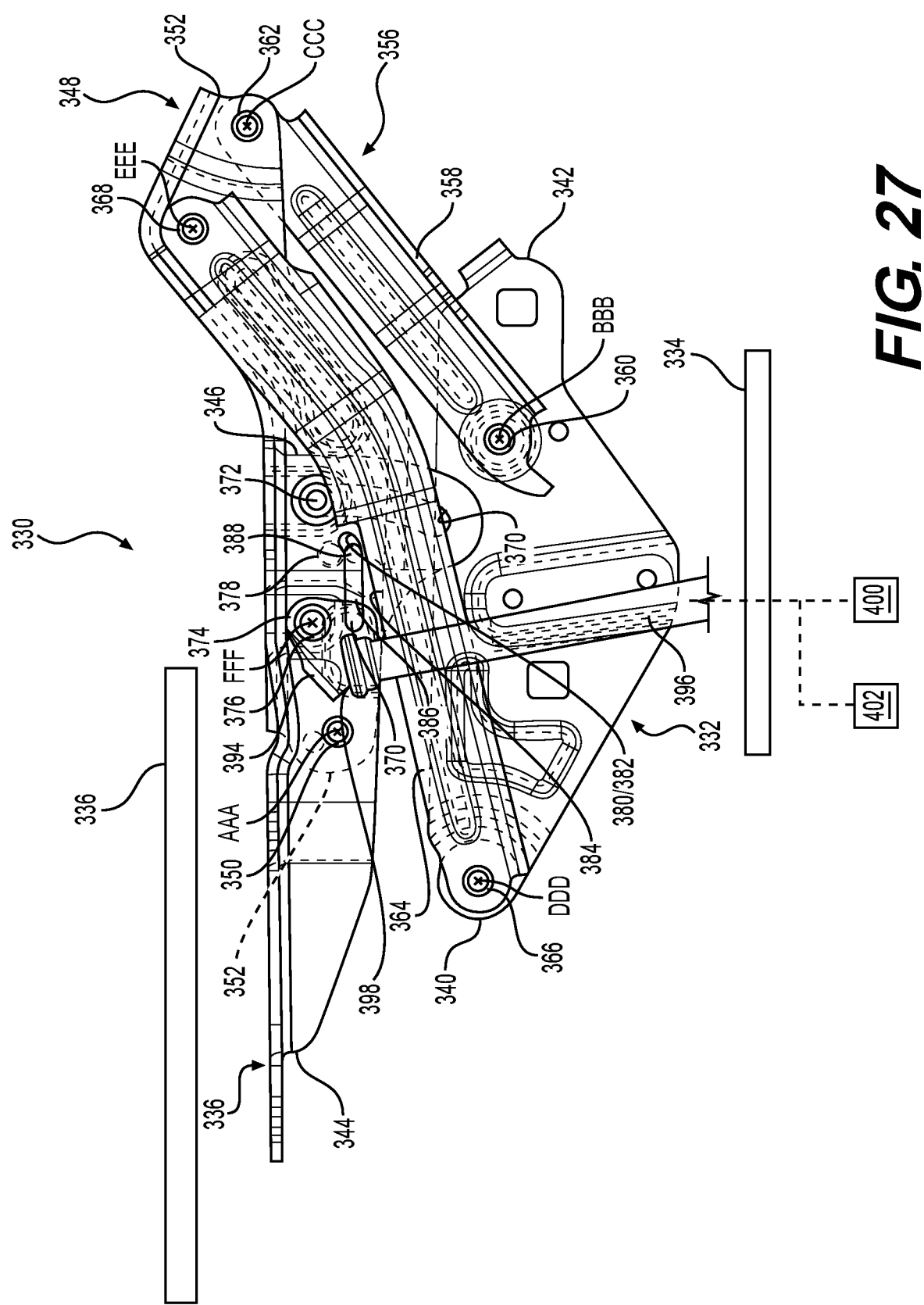
FIG. 27 is a side view of a third embodiment of the active hinge, illustrating the active hinge assembly in the normal mode with the hood closed.
Figure 28:
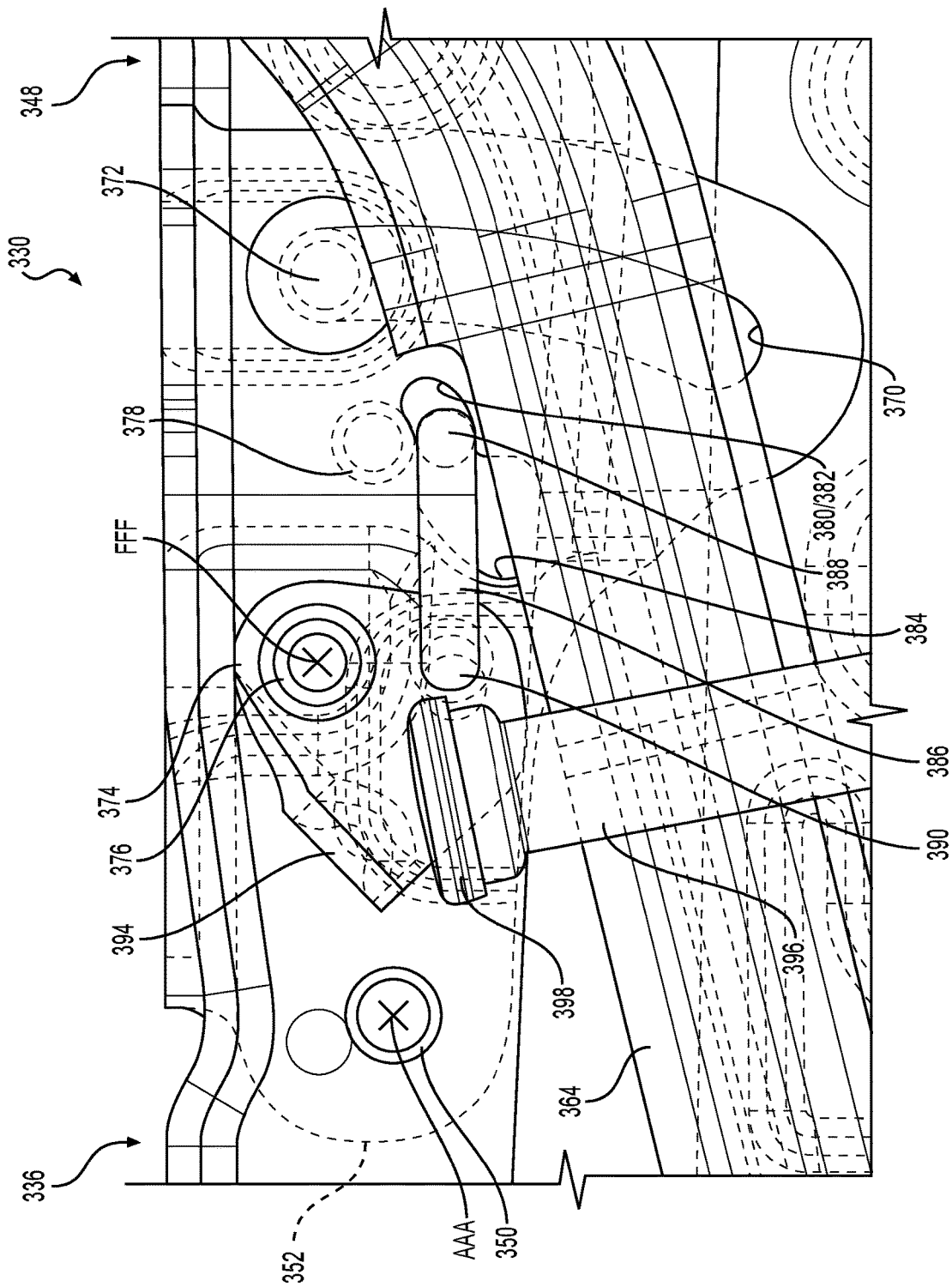
FIG. 28 is a magnified side view of a rotary bracket, release latching wire and release latching rivet of the third embodiment of the active hinge while the active hinge is in the normal mode.

A linkage assembly 356 connects the deploy bracket 348 to the body bracket 332 and provides pivoting movement of the deploy bracket 348 relative to the body bracket 332. More particularly, the linkage assembly 356 includes a short link 358 that is connected to the body bracket 352 along with a second pivot pin 360 along a second pivot axis BBB adjacent to the front end 342 of the body bracket 332, and is connected to the deploy bracket 348 along a third pivot pin 362 along a third pivot axis CCC adjacent to the front end 354 of the deploy bracket 348. The linkage assembly 356 also includes a long link 364 that is connected to the body bracket 332 along a fourth pivot pin 366 along a fourth pivot axis DDD adjacent to the rear end 340 of the body bracket 332, and is connected to the deploy bracket 348 along a fifth pivot pin 368 along a fifth pivot axis EEE adjacent to the front end 354 of the deploy bracket 348, but rearward of the third pivot axis CCC. As best shown in FIGS. 27-28, during normal mode operation of the active hinge 330, the linkage assembly 356 permits the hood bracket 336 to be rotated relative to the body bracket 332 between a closed position (in which the hood 338 is closed), and an open position in which the hood is open (for normal access to the engine compartment).

The hood bracket 336 further defines an arc-shaped slot 370 that is spaced radially outwardly from the first axis AAA and extends in a circumferential direction relative to the first axis AAA. The deploy bracket 348 includes a guide stud 372 that is received by the slot 370 of the hood bracket 336 such that a range of pivoting movement of the hood bracket 336 relative to the deploy bracket 348 is limited by the guide stud 372 engaging ends of the slot 370. A rotary bracket 374 is rotatably connected to the hood bracket 336 with a sixth pivot pin 376 located along a sixth axis FFF. A biasing element (not shown), such as a torsional spring, biases the rotary bracket 374 in a counter-clockwise direction about the sixth axis FFF. A release latching rivet 378 extends from the deploy bracket 342 in alignment with the rotary bracket 374 in the axial direction. The hood bracket 336 defines a wire guiding slot 380 adjacent to the release latching rivet 378. The wire guiding slot 380 has a narrow portion 382 that extends along a perimeter of the release latching rivet 378, and a wide portion 384 tapering outwardly relative to the narrow portion 382 as it extends toward the rear end 344 of the hood bracket 336. A release latching wire 386 includes a first end 388 received by the wire guiding slot and a second end 390 rotatably received by a pivot orifice 392 in the rotary bracket 374. Because the rotary bracket 374 is biased in the counter-clockwise direction, under a normal pre-deployment configuration (shown in FIGS. 27, 28, 31 and 32), the first end 388 of the release latching wire 386 is aligned with the release latching rivet 378 such that the hood bracket 336 is inhibited from rotating in a counter-clockwise direction relative to the deploy bracket 348. On the other hand, while in this position, the hood bracket 336 is inhibited from rotating in a clockwise direction relative to the deploy bracket 348 due to engagement of the guide stud 372 against an upper end of the guide slot 370.

The rotary bracket 374 further includes a flange 394 at a location that is radially spaced from the sixth pivot pin 376. As will be discussed in further detail below, an actuator 396 including a linearly moveable moving member 398 is aligned with the flange 394 such that upon the detection of a collision event, the moving member 398 engages the flange 394 and forces the rotary bracket 374 to rotate in a clockwise direction, thereby moving the first end 388 of the release latching wire 386 from the narrow end 382 of the wire guiding slot 380 to the wide portion 384 of the wire guiding slot 380, thereby also moving the first end 388 of the release latching wire 386 out of alignment with the release latching rivet 378 and allowing counter-clockwise movement of the hood bracket 336 relative to the deploy bracket 348. A controller 400 and associated sensors 342 are provided for detecting the collision event and instructing the actuator 396 to fire (like the previously described embodiments).

Figure 29:
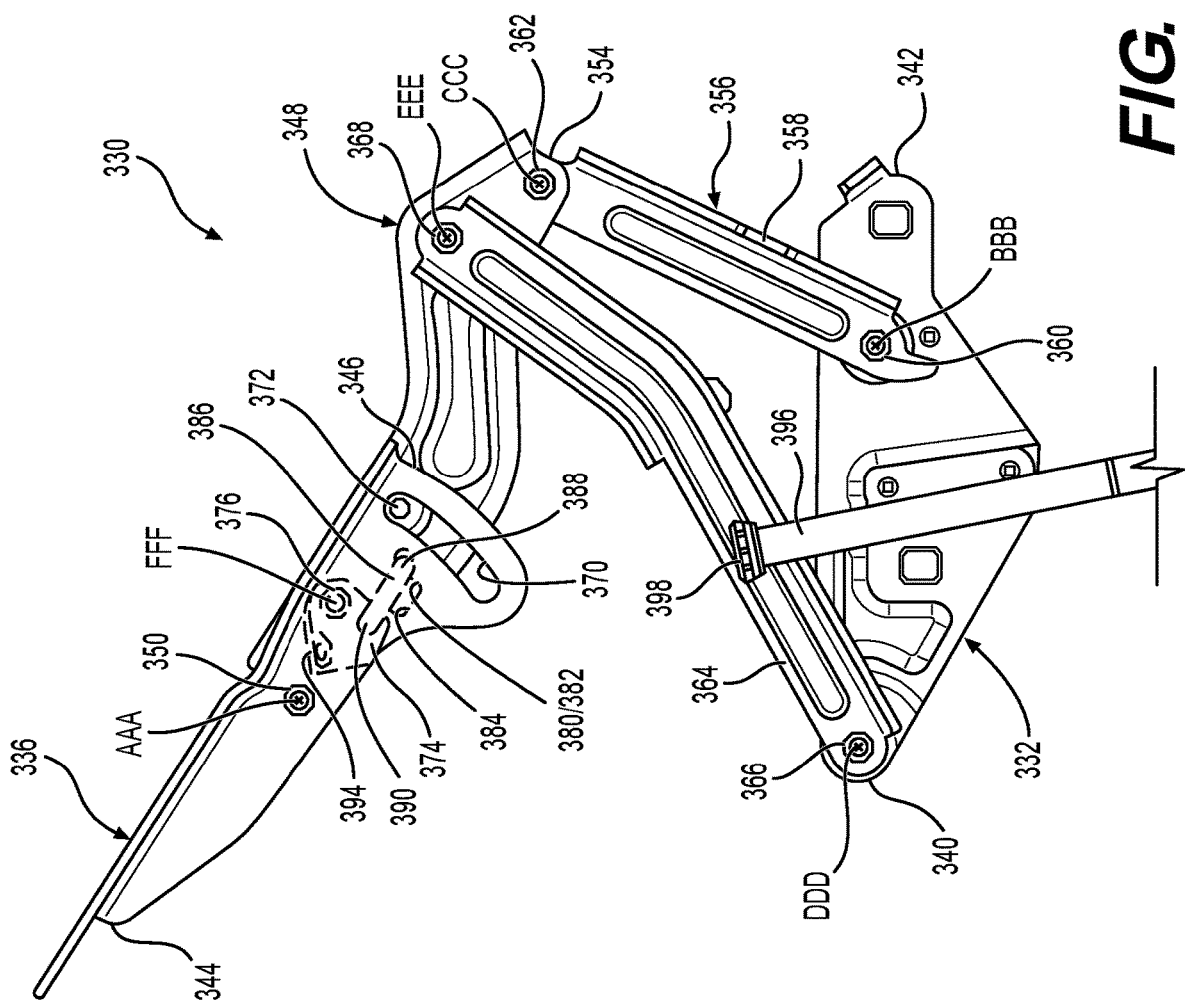
FIG. 29 is a side view of the third embodiment of the active hinge, illustrating movement of the hood via a linkage assembly while the active hinge is in the normal mode.
Figure 30:
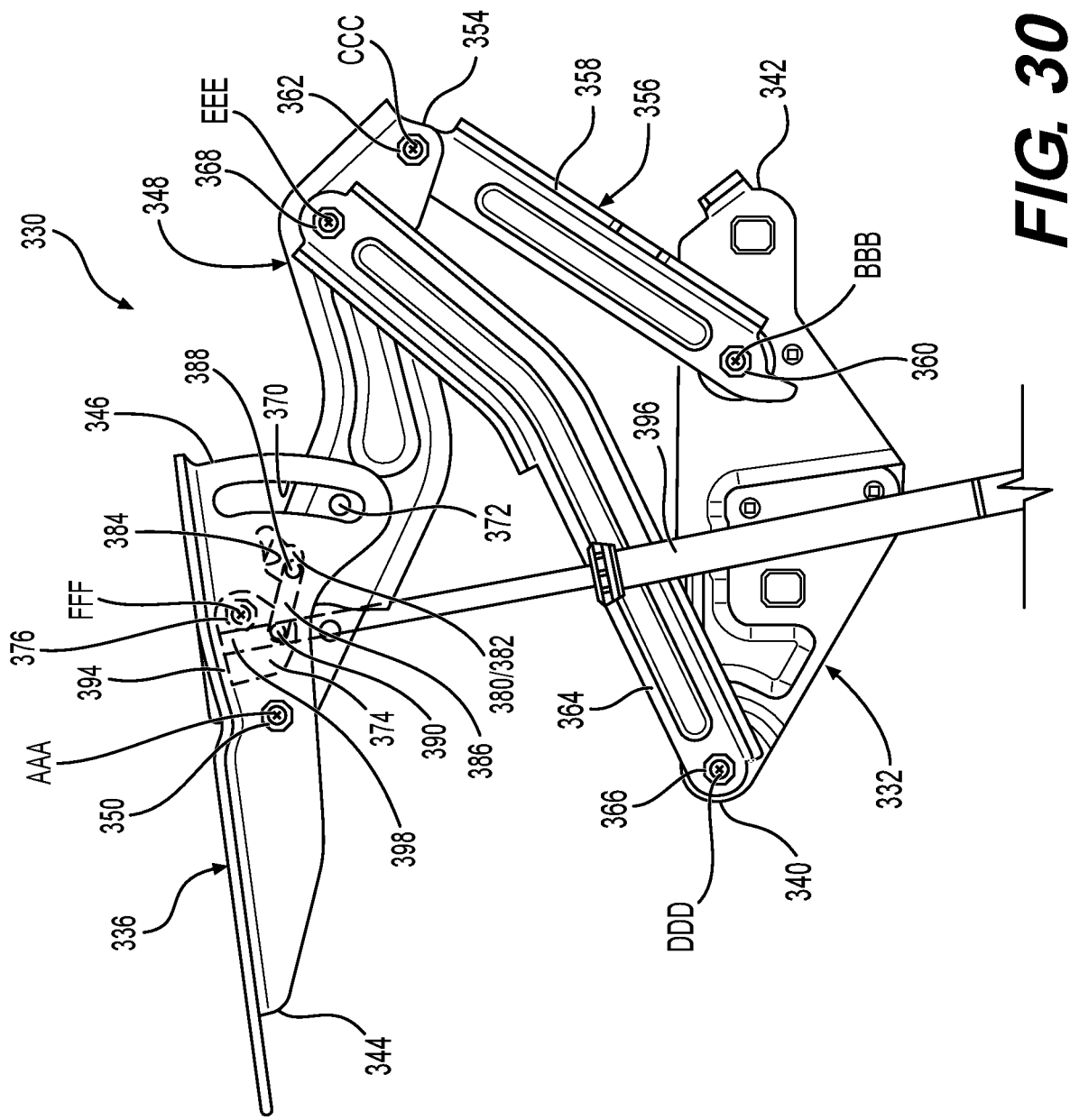
FIG. 30 is a side view of the third embodiment of the active hinge, illustrating the hood bracket pivoted relative to the deploy bracket while the active hinge is in the deployed mode.
Figure 31:
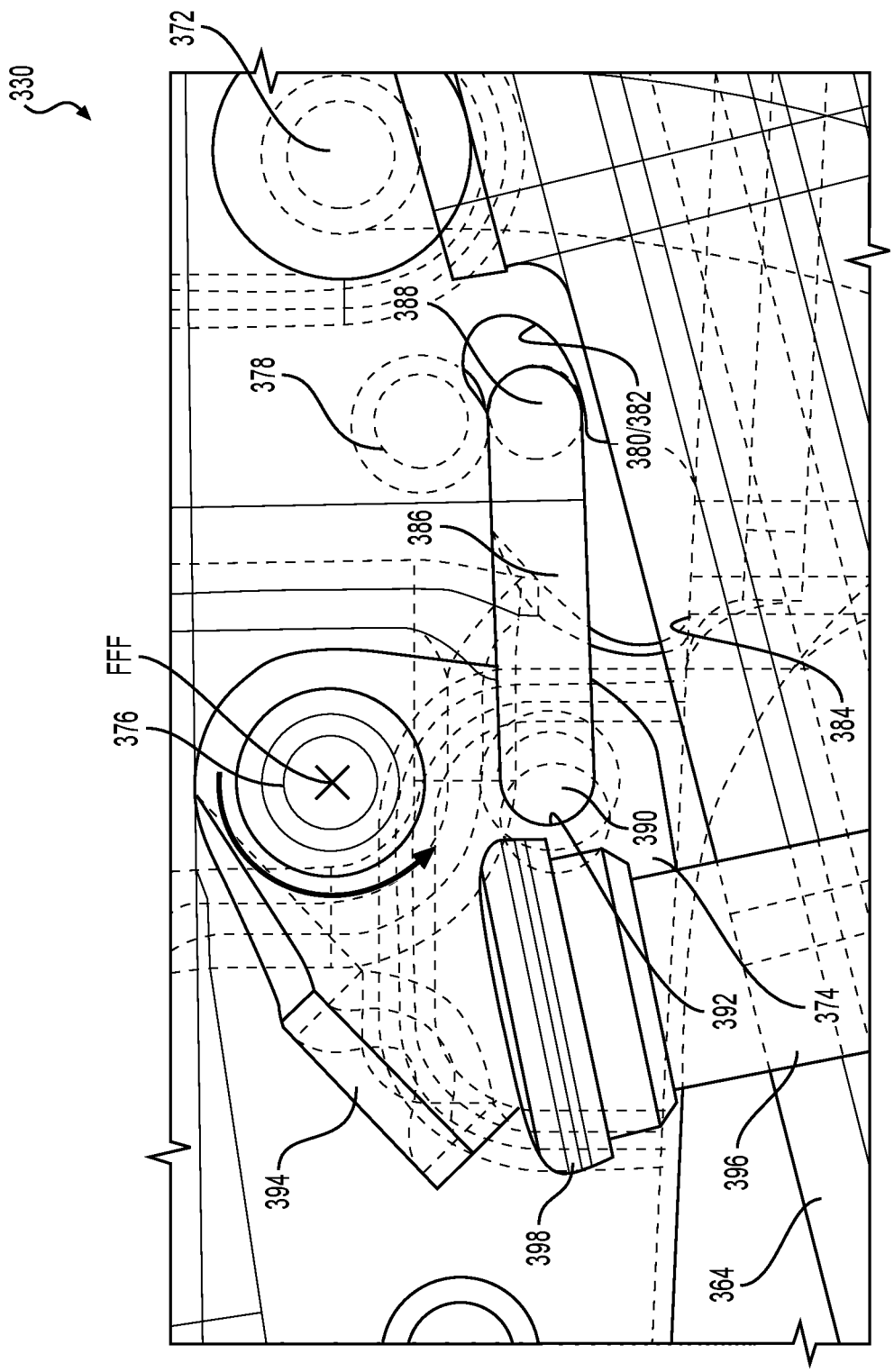
FIG. 31 is a magnified side view of the hood bracket, rotary bracket, and deploy bracket of the third embodiment of the active hinge, illustrating alignment of the release latching wire with the release latching rivet to prevent rotation of the hood bracket relative to the deploy bracket while the active hinge is in the normal mode.

During operation, as shown in FIGS. 27-28 and 31, while the hood 338 is in a closed position, the long and short links 364, 358 of the linkage assembly 356 are folded down in a compact position such that the hood bracket 336 is located in close proximity to the body bracket 332 in the vertical direction. Additionally, as previously noted, while in this position the rotary bracket 374 is biased in the counter-clockwise position such that the release latching wire 386 is biased in the narrow portion 382 of the release latching wire 386. Accordingly, rotation of the hood bracket 336 relative to the deploy bracket 348 is inhibited in the counter-clockwise direction by engagement of the first end 388 of the release latching wire 386 against the release latching rivet 378, and in the clockwise direction by engagement of the guide stud 372 against the end of the slot 370. This ensures that movement of the hood 338 is provided exclusively by movement of the hood bracket 336 relative to the body bracket 332 by the linkage assembly 356, as illustrated by FIG. 29, thus providing normal opening and closing of the hood 338 during normal use.

Figure 32:
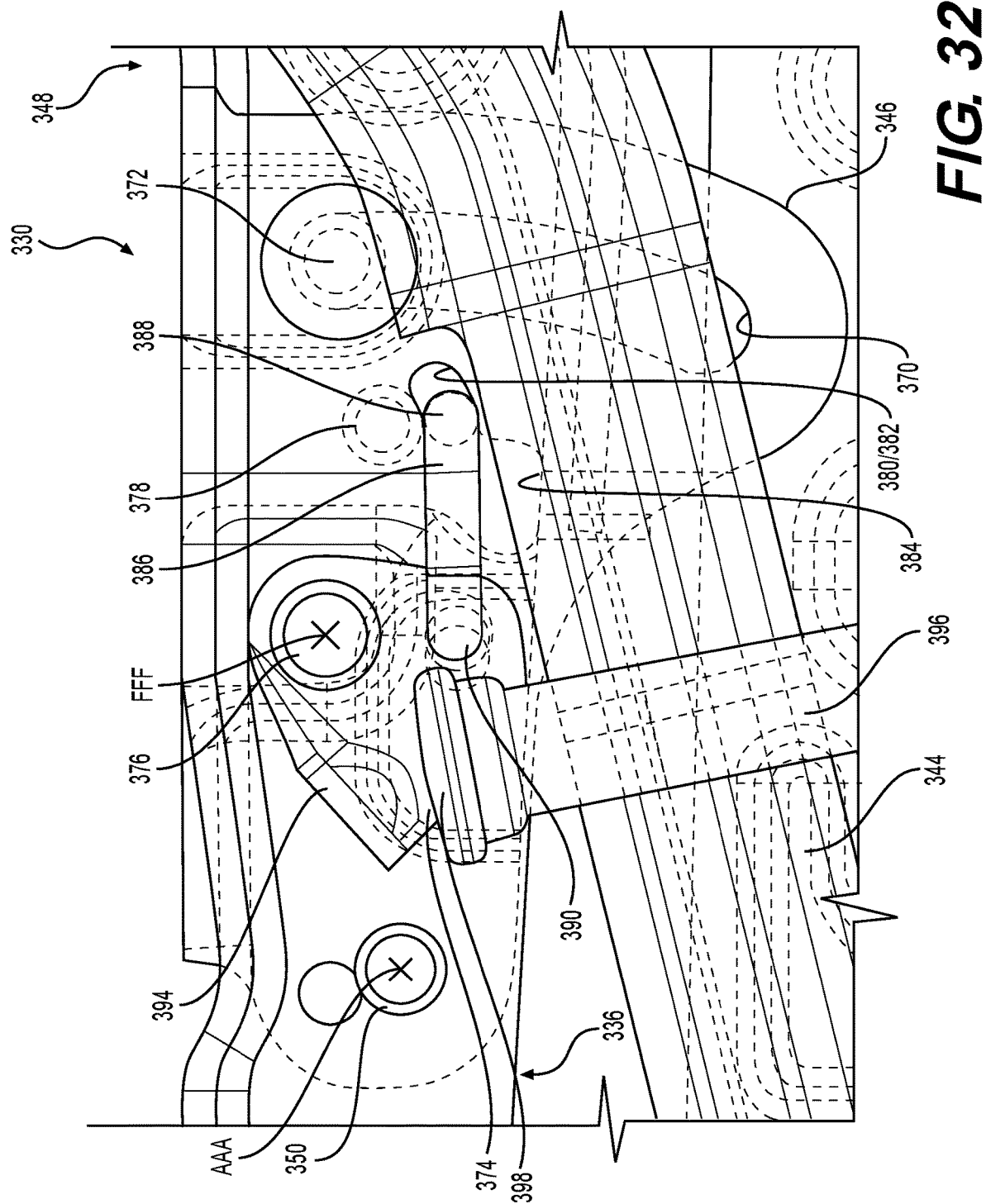
FIG. 32 is a magnified side view of the hood bracket, rotary bracket and deploy bracket of the third embodiment of the active hinge, illustrating the active hinge in the normal mode prior to deployment of the actuator.

FIGS. 32-34 illustrate deployment of the active hinge 330 into the active pedestrian (deployed) mode, in response to a detection of a collision event by the sensor 402. More particularly, FIG. 32 illustrated the actuator 396 prior to deployment. FIG. 33 illustrates the actuator 396 after initial deployment of the moving member 398. As shown, the moving member 398 of the actuator 396 engages the flange 394 of the rotary bracket 374, causing the rotary bracket 374 to rotate clockwise, thereby moving the release latching wire 386 from the narrow portion 382 of the wire guiding slot 380 to the wide portion 384 of the wire guiding slot 380, thereby also moving the first end 388 of the release latching wire 386 out of alignment with the release latching rivet 378. FIG. 34 illustrates continued movement of the moving member 398 against the flange 394, causing counter clockwise movement of the hood bracket 336 relative to the deploy bracket 348 about the first axis AAA, and causing vertical movement of the hood bracket 336 relative to the body bracket 332 via the linkage assembly 356 to the position shown in FIG. 30.

It should be appreciated that according to this embodiment of the active hinge 330, the release latching wire 386 moves along a path that isn't along a fixed, as opposed to active hinge assemblies that employ a breakable rivet for fixing a hood bracket relative to another bracket. Furthermore. The subject active hinge 330 can travel in an x-direction along a large distance from the pivot location. Additionally, the profile of the wide portion 384 of the slot 380 allows for tolerance compensation by making the joint always tight.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An active hinge for a vehicle, comprising:
a body bracket for attachment to a vehicle body;
a hood bracket for attachment to a vehicle hood and rotatable about a pivot point along a primary axis during a normal mode; and
an actuator for selectively transitioning the active hinge from the normal mode where the rotation of the hood bracket about the pivot point is restricted to a first extent, to an active pedestrian mode where the rotation of the hood bracket about the pivot point is restricted to a second extent being greater than the first extent, and wherein when the hood bracket pivots to the second extent the hood bracket moves in a rearward direction toward a rear of the vehicle.

2. The active hinge as set forth in claim 1, wherein the hood bracket has a proximal end and a distal end, wherein the proximal end is located closer to the pivot point than the distal end, wherein a linkage is pivotally attached to the body bracket and to the hood bracket adjacent to the proximal end, wherein the hood bracket is not moveable relative to the linkage when the linkage is in a locked state, wherein the hood bracket is moveable relative to the linkage when the linkage in an unlocked state, and wherein an actuator selectively transitions the linkage from the locked state to the unlocked state for allowing the hood bracket to rotate from a position in front of the pivot point to a position behind the pivot point in a direction toward a rear end of the vehicle.

3. The active hinge as set forth in claim 2, wherein the linkage includes a primary lever rotatably connected to the hood bracket along a secondary axis, wherein the primary lever is rotatably connected to the body bracket along the primary axis, wherein an upstop lever is rotatably connected to the primary lever and the body bracket along the primary axis, the upstop lever configured to limit rotation of the primary lever and the hood bracket relative to the body bracket to the first extent while in the normal mode and configured to allow rotation of the primary lever and hood bracket to the second extent while in the active pedestrian mode to allow additional upward and rearward travel of the hood of the vehicle, and wherein the upstop lever is configured to move from the normal mode to the deployed mode in response to actuation of the actuator in response to a detection of a collision event.

4. The active hinge as set forth in claim 3, wherein the hood bracket defines a guide slot extending in an arc shape, wherein the a deploy bracket is rotatably coupled to the primary lever, and wherein the deploy bracket includes a guide stud received by the guide slot, and wherein the actuator is configured to cause movement of the deploy bracket relative to the hood bracket with the guide stud moving along the guide slot, and to cause movement of the deploy bracket relative to the primary lever and movement of the upstop lever from the normal mode to the active pedestrian mode.

5. The active hinge as set forth in claim 4, wherein the deploy bracket presents an actuation flange aligned with the actuator, and wherein engagement of the actuation flange by the actuator causes the movement of the guide stud of the deploy bracket along the guide slot.

6. The active hinge as set forth in claim 5, wherein the primary lever defines a tapered slot having a narrow end located in alignment with the upstop lever and a wider end located out of alignment with the upstop lever, wherein a locking wire includes a first end rotatably connected to the hood bracket and a second end received in the tapered slot of the primary lever and moveable between the narrow end and the wider end, wherein the upstop lever engages the locking wire while the locking wire is located at the narrow end to inhibit pivoting of the upstop lever from the normal mode to the active pedestrian mode, and wherein movement of the deploy bracket by the actuator causes rotational movement of the primary lever relative to the hood bracket and movement of the locking wire from the narrow end to the wider end to permit the upstop lever to move from the normal mode to the active pedestrian mode.

7. The active hinge as set forth in claim 6 wherein a rivet couples the hood bracket to the deploy bracket such that during normal use the deploy bracket is fixed to the hood bracket, and wherein the rivet is configured to break in response to engagement of the actuator against the flange of the deploy bracket to permit movement of the deploy bracket relative to the hood bracket.

8. An active hinge comprising:
   a body bracket for attachment to a vehicle body;
   a hood bracket for attachment to a vehicle hood;
   a deploy bracket operatively coupled to the hood bracket by a first multi-bar linkage assembly and operatively coupled to the body bracket by a second multi-bar hood assembly;
   an actuator for selectively transitioning the active hood hinge from a normal mode wherein the movement of the hood bracket is defined by the movement of the first multi-bar linkage assembly allowing the hood bracket to move relative to the deploy bracket, to an active pedestrian mode where movement of the hood bracket is defined by both of the multi-bar link assemblies allowing the deploy bracket and the hood bracket to move relative to the body bracket.

9. The active hinge of claim 8, wherein the first multi-bar linkage assembly includes two links each pivotally coupled to the hood bracket and to the deploy bracket.

10. The active hinge of claim 8, wherein the second multi-bar linkage assembly includes two links each pivotally coupled to the body bracket and to the deploy bracket.

11. The active hinge of claim 8, wherein the second multi-bar linkage assembly allows the deploy bracket to move upwardly relative to the body bracket and the first multi-bar linkage assembly allows the hood bracket to move rearwardly relative to the deploy bracket.

12. The active hinge of claim 8, wherein second multi-bar linkage assembly is a drag-link type linkage, and the first multi-bar linkage assembly is a double-rocker type linkage.

13. The active hinge of claim 8, wherein the second multi-bar linkage assembly provides upward and rearward movement without significant rotation of the deploy bracket, and the first multi-bar linkage assembly allows an upward movement and rotation of the hood bracket.

14. The active hinge of claim 8, wherein a rivet fixes the deploy bracket to the hood bracket during normal operation, and wherein the actuator is configured to break the rivet in response to a detection of a collision event.

15. An active hinge for a vehicle, comprising:
   a body bracket for attachment to a vehicle body;
   a hood bracket for attachment to a vehicle hood;
   a deploy bracket rotatably connected to the hood bracket;
   a linkage assembly interconnecting the deploy bracket and the body bracket;
   a release latching link moveable between a locked position and an unlocked position, wherein the release latching link inhibits movement of the hood bracket relative to the deploy bracket when in the locked position, and wherein the release latching link allows movement of the hood bracket relative to the deploy bracket in a rearward direction toward a rear of the vehicle when in the unlocked position;
   an actuator configured to selectively move the release latching link from the locked position to the unlocked position; and
   wherein the releasing latching link is a wire.

16. The active hinge as set forth in claim 15, wherein the hood bracket is rotatable relative to the deploy bracket about a primary axis, wherein a release latching rivet extends from the deploy bracket, wherein the release latching link is aligned with the release latching rivet in a circumferential direction relative to the primary axis while in the locked position to inhibit movement of the hood bracket relative to the deploy bracket when in the locked position, and wherein the release latching link is out of alignment with the release latching rivet in the circumferential direction relative to the primary axis while in the unlocked position to allow movement of the hood bracket relative to the deploy bracket.

17. The active hinge as set forth in claim 16, wherein a rotary bracket is rotatably connected to the hood bracket along a secondary axis, wherein the hood bracket defines a wire guiding slot, wherein the rotary bracket defines a pivot orifice, wherein a first end of the release latching link extends through the wire guiding slot, wherein a second end of the release latching link extends through the pivot orifice, and wherein the actuator is configured to engage and rotate the rotary bracket about the secondary axis to move the release latching link within the wire guiding slot from the locked position to the unlocked position.

18. The active hinge as set forth in claim 17, wherein the wire guiding slot has a narrow portion circumferentially aligned with the release latching rivet relative to the primary axis, wherein the wire guiding slot has a wide portion tapering outwardly relative to the narrow portion, wherein the first end of the release latching link is located in the narrow portion while in the locked position, and wherein the first end of the release link is located in the wide portion while in the unlocked position in response to rotation of the rotary bracket by the actuator.

19. The active hinge as set forth in claim 18, wherein the hood bracket defines an arc-shaped slot extending in a generally circumferential direction relative to the primary axis, wherein the deploy bracket presents a guide stud received by the arc-shaped slot of the hood bracket, and wherein engagement of the guide stud against ends of the arc-shaped slot limits pivoting of the hood bracket relative to the deploy bracket about the primary axis.

20. The active hinge as set forth in claim 19, wherein pivoting of the hood bracket relative to the deploy bracket about the primary axis in a first direction is inhibited by engagement of the release link against the release latching rivet when the release latching link is in the locked position, and wherein pivoting of the hood bracket relative to the deploy bracket in a second direction opposite the first direction is inhibited by engagement of the guide stud against one of the ends of the arc-shaped slot when the release latching link is in the locked position.

21. An active hinge for a vehicle, comprising:
   a body bracket for attachment to a vehicle body;
   a hood bracket for attachment to a vehicle hood and moveable relative to the body bracket to a first extent while in a normal mode and moveable relative to the body bracket in a rearward direction toward a rear of the vehicle to a second extent while in an active pedestrian mode;
   a locking arrangement having a locked state for preventing the movement of the hood bracket from the normal mode to the active pedestrian mode, and an unlocked state for allowing the movement of the hood bracket from the normal mode to the active pedestrian mode;
   an actuator for moving the locking arrangement from the locked state to the unlocked state; and wherein the locking arrangement includes a rod being moveable in response to actuation of the actuator.

22. The active hinge of claim 21, wherein the rod comprises at least one bend.

23. The active hinge of claim 22, wherein the rod comprises at least two bends.

24. The active hinge of claim 21, wherein the rod comprises a first end coupled to a rotary bracket having a pivot axis, and wherein rotation of the rotary bracket about the pivot axis causes movement of the rod.

25. The active hinge of claim 21, wherein the active hinge further comprises a deploy bracket coupling the hood bracket to the body bracket, and wherein the locking arrangement prevents or facilitates the movement of the deploy bracket relative to the body bracket.

26. The active hinge of claim 21, wherein the rod is a latching wire.

* * * * *